United States Patent
Tabata et al.

(10) Patent No.: US 9,614,817 B2
(45) Date of Patent: Apr. 4, 2017

(54) APPARATUS, SYSTEM, METHOD, AND MEDIUM

(71) Applicant: FUJITSU LIMITED, Kawasaki-shi, Kanagawa (JP)

(72) Inventors: Nobuyasu Tabata, Fukuoka (JP); Koki Mie, Fukuoka (JP); Katsuhiko Yamatsu, Fukuoka (JP); Tatsuya Soneda, Fukuoka (JP); Taiji Kondo, Chiba (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/540,106

(22) Filed: Nov. 13, 2014

(65) Prior Publication Data

US 2015/0143104 A1    May 21, 2015

(30) Foreign Application Priority Data

Nov. 18, 2013 (JP) ................. 2013-238137

(51) Int. Cl.
*H04L 29/06* (2006.01)
*H04W 4/00* (2009.01)
(Continued)

(52) U.S. Cl.
CPC ........ *H04L 63/0435* (2013.01); *H04L 63/068* (2013.01); *H04W 4/005* (2013.01); *H04W 12/04* (2013.01); *H04W 84/18* (2013.01)

(58) Field of Classification Search
CPC .... H04L 63/00; H04L 63/101; H04L 63/1441
See application file for complete search history.

(56) References Cited

U.S. PATENT DOCUMENTS 4,864,615 A * 9/1989 Bennett ................ H04N 7/1675
        348/E7.056
8,204,224 B2 * 6/2012 Xiao ..................... H04L 9/0838
        380/260

(Continued)

FOREIGN PATENT DOCUMENTS

| JP | 2005-117254 | 4/2005 |
| JP | 2011-130224 | 6/2011 |
| WO | WO 2011/013165 A1 | 2/2011 |

OTHER PUBLICATIONS

Dacosta et al., One Time Cookies Preventing session hijacking attaches with stateless authentication tokens, Jun. 2012, ACM Transactions on Internet Technology vol. 12 No. 1, article 1.*

(Continued)

*Primary Examiner* — Luu Pham
*Assistant Examiner* — Harvey Cohen
(74) *Attorney, Agent, or Firm* — Staas & Halsey LLP

(57) ABSTRACT

An apparatus includes a memory; and a processor coupled to the memory and configured to generate a first common key whose key value varies based on a first elapsed time when a notification of the first elapsed time after a start-up of another apparatus to which a data frame to be encrypted is to be transmitted has been made, generate a second common key whose key value varies based on a second elapsed time after a start-up of the apparatus when a notification of the first elapsed time has not been made, and encrypt the data frame by any one of the first common key and the second common key as a common key and transmit the encrypted data frame to the another apparatus.

13 Claims, 22 Drawing Sheets

(51) Int. Cl.
*H04W 12/04* (2009.01)
*H04W 84/18* (2009.01)

(56) References Cited

U.S. PATENT DOCUMENTS

| | | | | |
|---|---|---|---|---|
| 2006/0159260 A1* | 7/2006 | Pereira | H04W 12/04 | 380/44 |
| 2007/0127720 A1* | 6/2007 | White | H04N 5/76 | 380/277 |
| 2007/0253352 A1* | 11/2007 | Arisha | H04W 52/245 | 370/328 |
| 2008/0095368 A1* | 4/2008 | Iida | H04L 63/0272 | 380/259 |
| 2009/0144199 A1* | 6/2009 | Oertel | G06Q 10/00 | 705/50 |
| 2010/0205435 A1* | 8/2010 | Xie | H04L 9/32 | 713/168 |
| 2011/0093717 A1* | 4/2011 | Iwao | H04L 9/12 | 713/179 |
| 2011/0126009 A1* | 5/2011 | Camp, Jr. | H04L 9/0825 | 713/168 |
| 2012/0106552 A1* | 5/2012 | Iwao | H04L 45/36 | 370/392 |
| 2014/0164779 A1* | 6/2014 | Hartley | H04L 9/3247 | 713/176 |
| 2016/0218866 A1* | 7/2016 | Patil | H04L 9/0833 | |

OTHER PUBLICATIONS

Garmany, Prime Private RSA Infrastructure for memory-less encryption, Dec. 2013, ACM 29th Computer Security Applications Conference, pp. 149-158.*

Bhattacharjya et al., Strong Efficient Reliable personal messaging peer to peer architecture based on Hybrid RSA, ICC Proceedings of International Conference Internet of things and Cloud Computing, Article 46.*

Kalaiselvi et al, Secure Group Communication Using NonInteractive Key Computation Multiparty Key Agreement, Proceedings 2008 Conference on Computing Communications and Networking, 2008, pp. 1-6.*

Huang et al., Constructing Secure Point to Point Wireless Environments Integrating Diffie Hellman PKDS and Stream Ciphering, 2010, IEEE 2010 Conference on Complex Intelligent Software Intensive Systems, pp. 384-390.*

Bhoi et al., SST A Secure Fault Tolerant Smart Transportation System for Vehicle Ad Hoc Network, 2012, 2nd IEEE International Conference on Parallel Distributed and Grid Computing, pp. 545-550.*

* cited by examiner

FIG. 9

| ITEM | MEANING | SIZE |
|---|---|---|
| FRAME CONTROL | WHAT DEFINES CONTROL INFORMATION OF AE | 2 BYTES |
| SPARE | | b12-b16 |
| FRAME TYPE | 0×0 : HELLO<br>0×1 : SPARE<br>0×2 : DATA<br>0×3 : SPATE | b10-b11 |
| SPARE | | b7-b9 |
| KEY TYPE | 0×00 : FIXED COMMON KEY<br>0×01 : VARIABLE COMMON KEY OF LD<br>0×02 : VARIABLE COMMON KEY OF LS<br>0×03 : SPATE | b5-b6 |
| KEY-ID | VALUE CALCULATED FROM ELAPSED TIME | b1-b4 |

FIG. 10

| PARAMETER | EXPLANATION |
|---|---|
| LOCAL SOURCE ADDRESS (LS) | ADDRESS OF NEIGHBORING NODE APPARATUS |
| ELAPSED TIME | ELAPSED TIME OF LS |

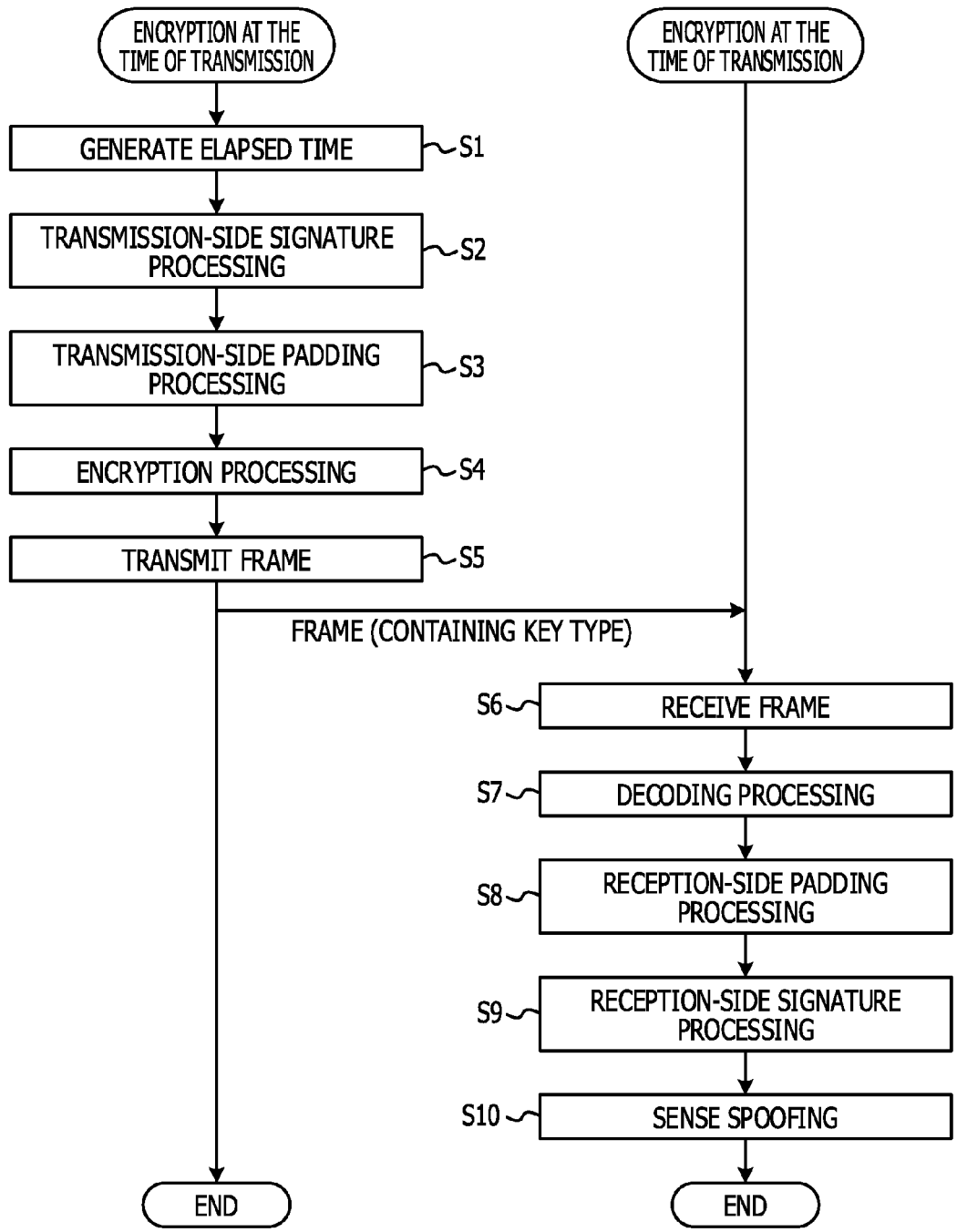

FIG. 18
1. GD RETRIEVAL REQUEST
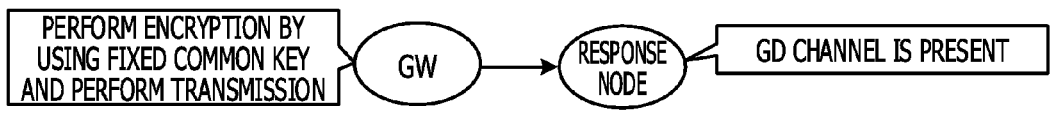
A-2. GD RETRIEVAL RESPONSE (IN CASE OF ENCRYPTION USING FIXED KEY)
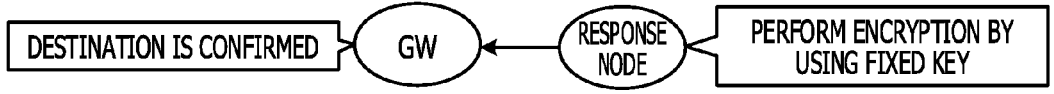
A-3. EXAMPLE OF SUBSEQUENT TRANSMISSION AND RECEPTION
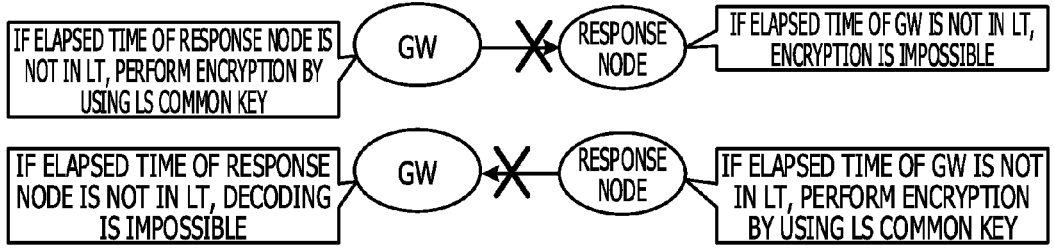
B-2. GD RETRIEVAL RESPONSE (IN CASE OF ENCRYPTION USING LD COMMON KEY)
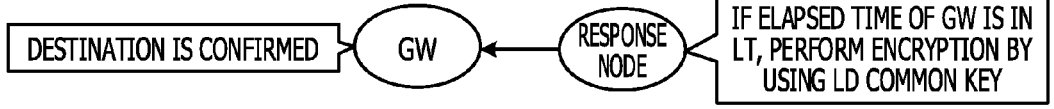
B-3. EXAMPLE OF SUBSEQUENT TRANSMISSION AND RECEPTION
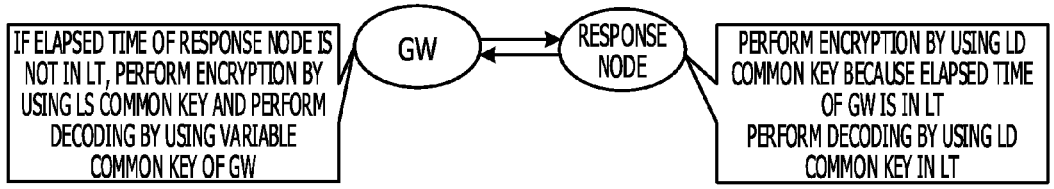

APPARATUS, SYSTEM, METHOD, AND MEDIUM

CROSS-REFERENCE TO RELATED APPLICATION

This application is based upon and claims the benefit of priority of the prior Japanese Patent Application No. 2013-238137, filed on Nov. 18, 2013, the entire contents of which are incorporated herein by reference.

FIELD

The embodiment discussed herein is related to an apparatus, a system, a method, and a medium.

BACKGROUND

In an ad hoc network, node apparatuses autonomously form a network. As a result of the node apparatuses autonomously performing communication, the user does not have to set a communication route at any time and there is no necessity for dedicated communication terminals and infrastructures, such as a server and a router, which manage the communication. As related technology, a technique of autonomously forming an ad hoc network by using a HELLO frame has been proposed (see, for example, International Publication Pamphlet No. WO 2011/013165).

When the node apparatuses perform communication, the security of a frame to be communicated has to be secured. Therefore, when the node apparatuses perform communication, after encrypting data to be communicated, the node apparatus transmits a frame to another node apparatus at the other end. As related technology, a technique of performing encryption by obtaining a peak position time by shaking two communication terminal devices several times while holding the communication terminal devices integrally has been proposed (see, for example, Japanese Laid-open Patent Publication No. 2011-130224).

SUMMARY

According to an aspect of the invention, an apparatus includes a memory; and a processor coupled to the memory and configured to generate a first common key whose key value varies based on a first elapsed time when a notification of the first elapsed time after a start-up of another apparatus to which a data frame to be encrypted is to be transmitted has been made, generate a second common key whose key value varies based on a second elapsed time after a start-up of the apparatus when a notification of the first elapsed time has not been made, and encrypt the data frame by any one of the first common key and the second common key as a common key and transmit the encrypted data frame to the another apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a diagram describing an example of each item of the ad hoc header;

FIG. 10 is a diagram describing an example of the configuration of a link table;

FIG. 13 is a flowchart describing an example of processing of an embodiment;

FIG. 18 is a diagram (I) describing an example of encryption and decoding in a second application example;

DESCRIPTION OF EMBODIMENT

First, the study made by the inventors will be described. When communication is performed between node apparatuses, the communication is performed in units of a frame. As an example of the frame, there are a HELLO frame and a data frame. The HELLO frame used to perform channel creation does not have to have a high degree of confidentiality.

Therefore, in the case of the HELLO frame, a common key whose key value is fixed (hereinafter referred to as a fixed common key) may be used. On the other hand, the data frame (the frame containing the contents of data to be transmitted) has to have a high degree of confidentiality. Therefore, it is not desirable to encrypt the data frame by using a fixed common key.

Thus, when the data frame is communicated, it is preferable to encrypt the data frame by using a common key whose key value varies (hereinafter referred to as a variable common key). By encrypting the data frame by using a variable common key, it is possible to perform communication with a high degree of confidentiality.

When a data frame is encrypted and decoded by using a variable common key, both a node apparatus that transmits a frame and a node apparatus that receives the frame have to recognize the variable common key. Since the key value of the variable common key varies, both the node apparatus on the transmission side and the node apparatus on the reception side have to recognize the varying key value.

Therefore, each node apparatus has to have the function of being capable of recognizing the variable common key. It is for this reason that each node apparatus has to have hardware resources that implement the function of recognizing the variable common key. Some node apparatuses have scarce hardware resources. Thus, in this case, it becomes impossible to perform communication with a high degree of confidentiality.

With examples described below, it is possible to perform ad hoc network communication with a high degree of confidentiality.

<Example of Channel Creation Using a HELLO Frame>

Figure 1:
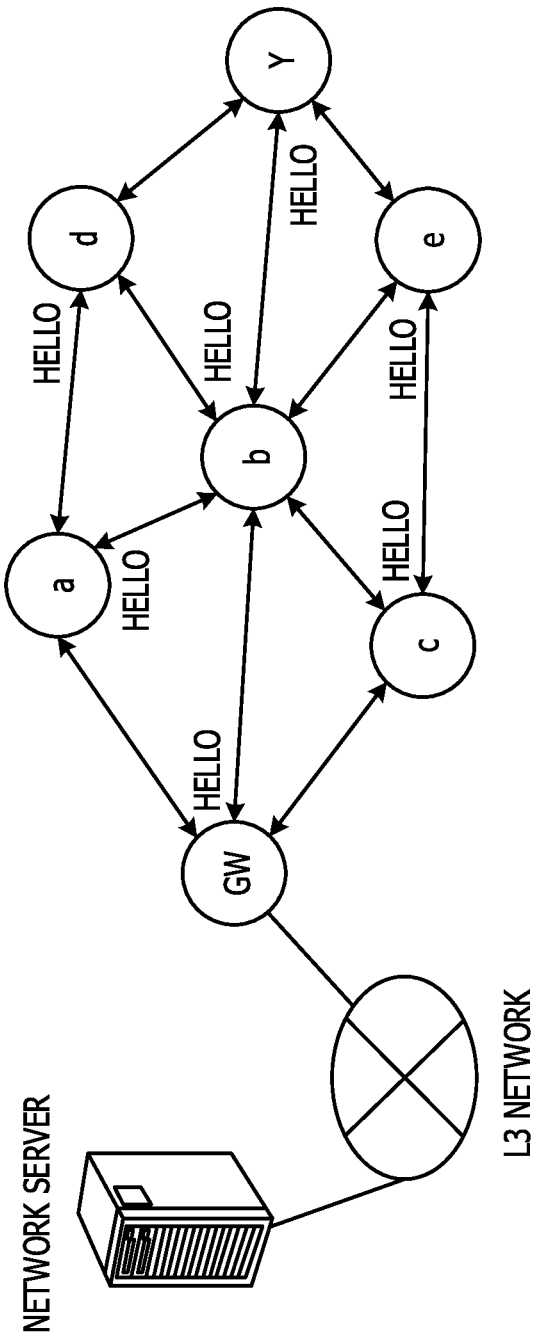
FIG. 1 is a diagram (I) depicting an example of channel creation using a HELLO frame.

With reference to FIG. 1, an example of channel creation using a HELLO frame will be described. An ad hoc network depicted in FIG. 1 as an example includes a gateway apparatus GW and node apparatuses a to e and Y. The gateway apparatus is a kind of node apparatus. Moreover, the gateway apparatus further has the function of performing communication with a network server via an L3 network.

As an example, it is possible to use a smart meter as the node apparatuses a to e and Y. The smart meter is a measuring instrument that measures the usage of electric power, gas, water, and so forth and has a communication function. The smart meter is capable of transmitting the measured value to the network server by using the communication function.

As an example, the node apparatuses a to e and Y transmit a frame to the gateway apparatus GW. The gateway apparatus GW receives the frame transmitted by the node apparatuses a to e and Y. The gateway apparatus GW transmits the received frame to the network server via the L3 network.

The HELLO frame is a frame which is broadcast by the node apparatuses simultaneously to the adjacent node apparatuses when a communication channel is created. The data frame is a frame containing the contents of data to be transmitted by the node apparatus.

The ad hoc network depicted in FIG. 1 as an example is an ad hoc network configured like a mesh. The gateway apparatus GW and the node apparatuses a to e and Y broadcast a HELLO frame on a regular basis to the adjacent gateway apparatus GW or node apparatuses a to e and Y.

The HELLO frame has various information such as channel information and communication quality information. The gateway apparatus GW and the node apparatuses a to e and Y perform appropriate channel creation by broadcasting the HELLO frame on a regular basis.

Figure 2:
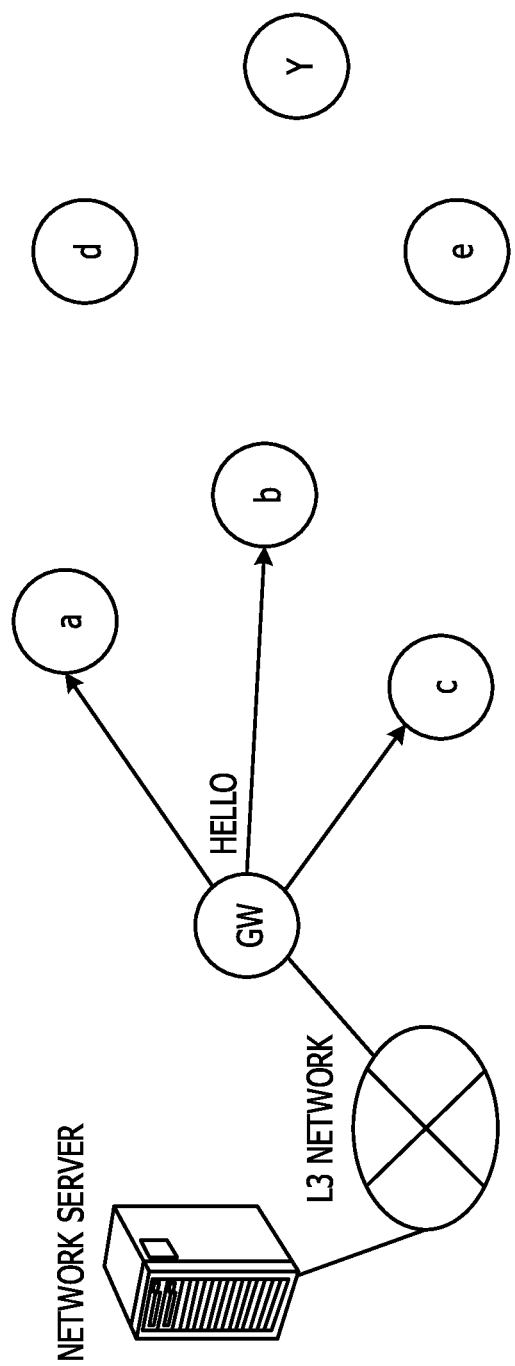
FIG. 2 is a diagram (II) depicting an example of channel creation using a HELLO frame.

FIG. 2 depicts an example in which the gateway apparatus GW broadcasts the HELLO frame. The gateway apparatus GW broadcasts the HELLO frame to the node apparatuses a, b, and c at the time at which the gateway apparatus GW has to transmit the HELLO frame. The node apparatuses a, b, and c receive the HELLO frame.

The node apparatuses a, b, and c calculate the channel quality and the communication quality of a link based on the received HELLO frame and store the calculation result in a table (which is referred to as a routing table).

Figure 3:
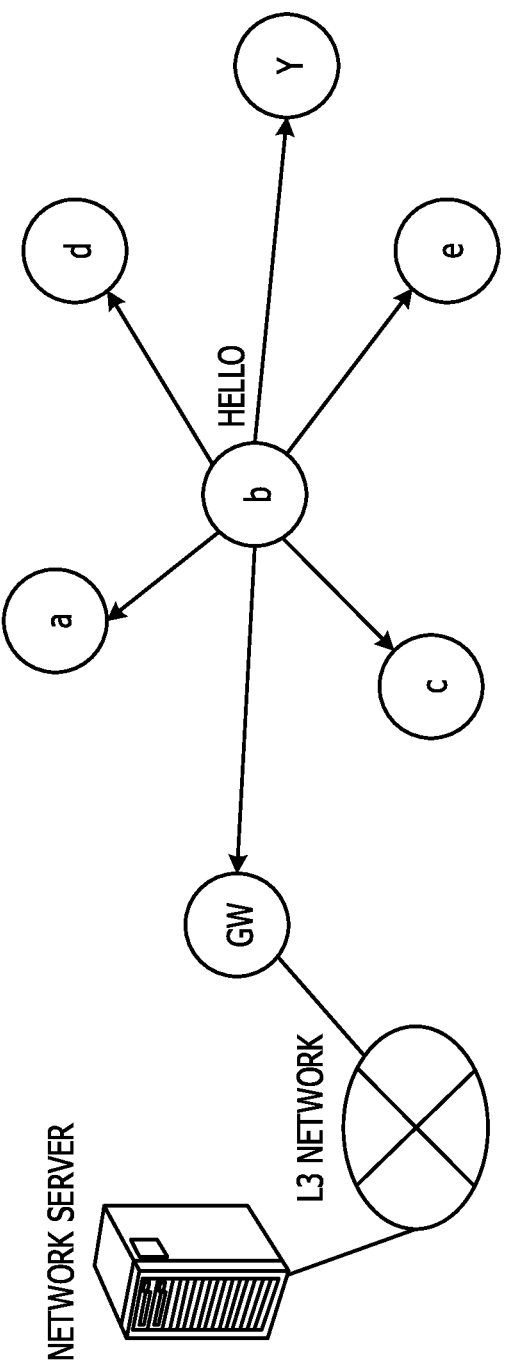
FIG. 3 is a diagram (III) depicting an example of channel creation using a HELLO frame.

Next, attention is focused on the node apparatus b. As depicted in FIG. 3, the node apparatus b broadcasts the HELLO frame containing the information on the node apparatus, the HELLO frame held thereby, at the time at which the node apparatus b has to transmit the HELLO frame. This HELLO frame also contains the information on the gateway apparatus GW. The node apparatus b broadcasts the HELLO frame to the node apparatuses d, e, and Y.

Next, attention is focused on the node apparatus Y. The node apparatus Y receives the HELLO frame transmitted by the node apparatus b. The node apparatus Y calculates the channel quality and the communication quality of the link based on the received HELLO frame and stores the calculation result in the routing table.

The same goes for the node apparatuses d and e, and the node apparatuses d and e calculate the channel quality and the communication quality of the link based on the received HELLO frame and store the calculation result in the routing table. Then, the node apparatus d broadcasts the HELLO frame to the node apparatuses a and Y. In a similar way, the node apparatus e broadcasts the HELLO frame to the node apparatuses c and Y.

Figure 4:
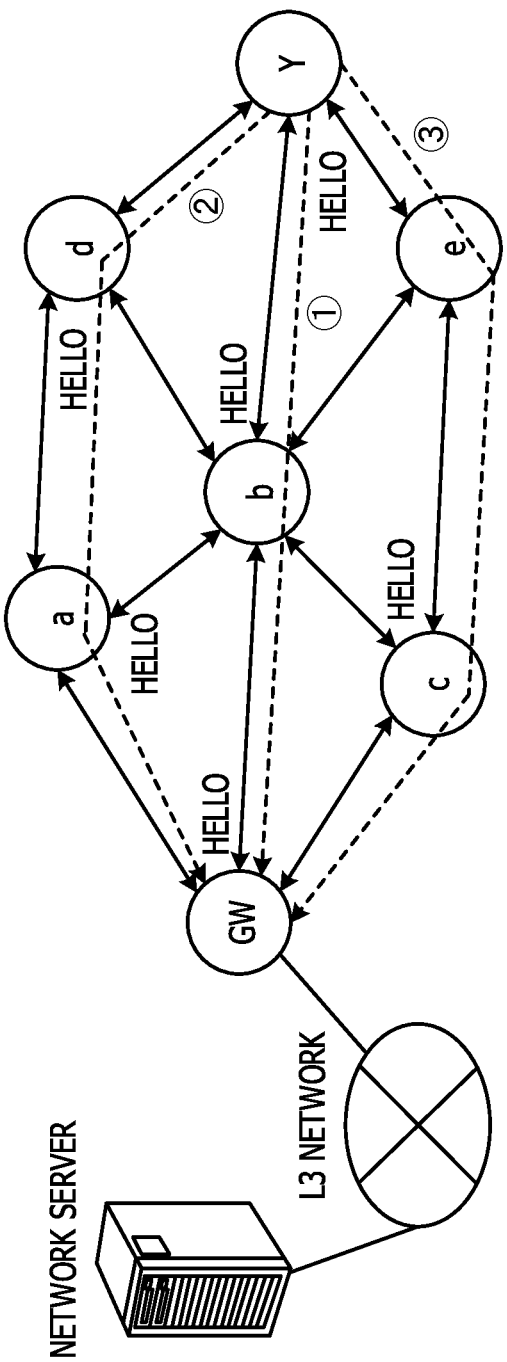
FIG. 4 is a diagram (IV) depicting an example of channel creation using a HELLO frame.

As a result, as depicted in FIG. 4, the HELLO frame is propagated to the gateway apparatus GW and all the node apparatuses: the node apparatuses a to e and Y. When the node apparatus Y transmits the data frame to the gateway apparatus GW, the node apparatus that has received the data frame refers to the information in the routing table thereof. Then, the node apparatus selects an appropriate node apparatus as a node apparatus which is a next destination based on the information in the routing table.

Selection of an appropriate node apparatus is performed based on the information on the channel quality, the communication quality, and so forth which is stored in the routing table. As an example, the node apparatus Y may transmit the data frame to the gateway apparatus GW via the node apparatus b.

However, the quality of the communication channel of the node apparatus Y, the node apparatus d, the node apparatus a, and the gateway apparatus GW is sometimes better than the quality of the communication channel of the node apparatus Y, the node apparatus b, and the gateway apparatus GW. In this case, although the number of hops of the communication channel of the node apparatus Y, the node apparatus d, the node apparatus a, and the gateway apparatus GW is greater than the number of hops of the communication channel of the node apparatus Y, the node apparatus b, and the gateway apparatus GW, the communication channel of the node apparatus Y, the node apparatus d, the node apparatus a, and the gateway apparatus GW is selected as an appropriate channel.

<Example of the Ad Hoc Network Configuration>

Figure 5:
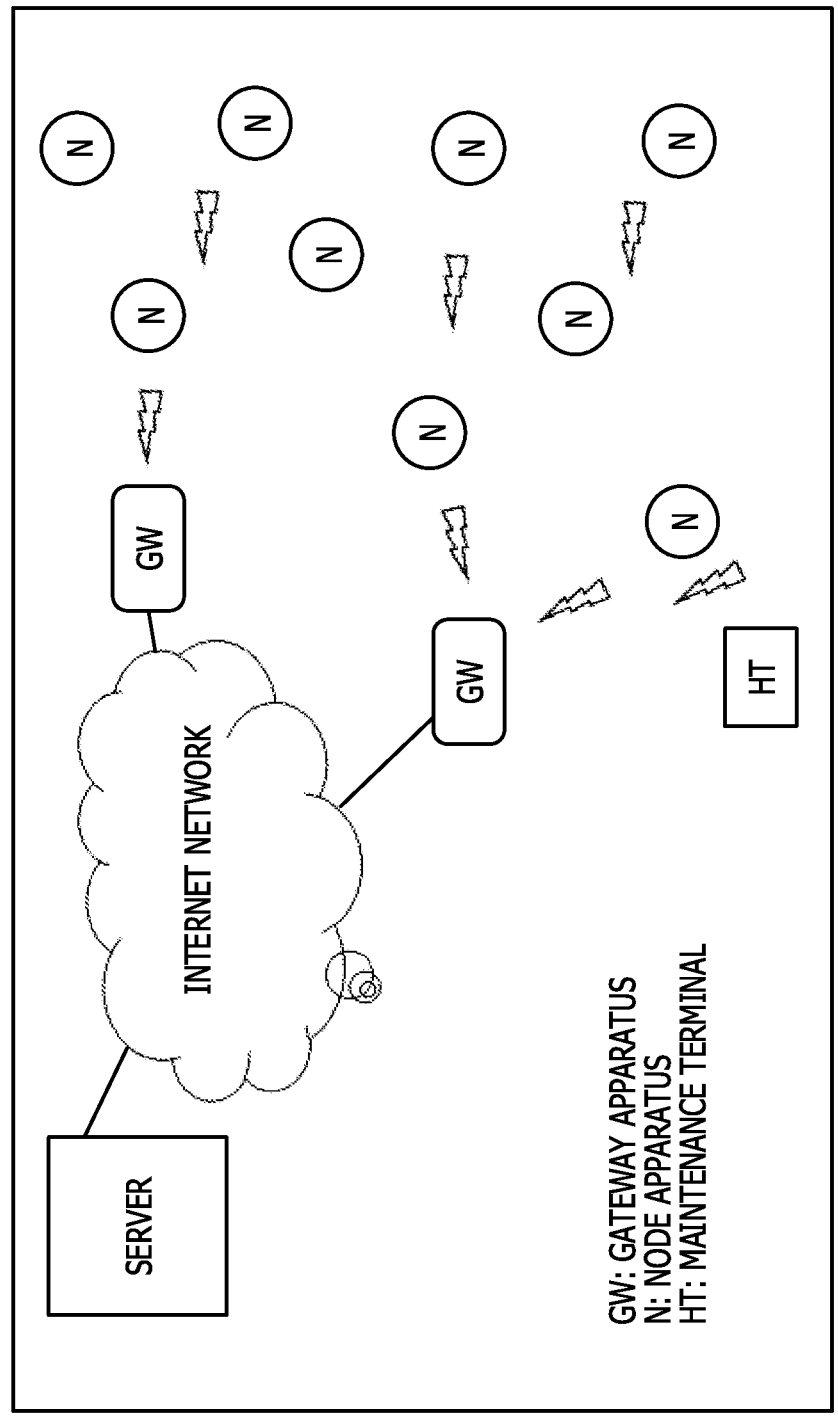
FIG. 5 is a diagram depicting an example of the configuration of an ad hoc network.

FIG. 5 depicts an example of the configuration of the ad hoc network. In FIG. 5, a plurality of node apparatuses N, two gateway apparatuses GW, and a maintenance terminal HT take part in the ad hoc network. The two gateway apparatuses GW are connected to a server via an Internet network.

Wireless or wired communication may be performed between the apparatuses that take part in the ad hoc network. In the embodiment, it is assumed that wireless communication is performed between the apparatuses.

The two gateway apparatuses GW and the maintenance terminal are each a kind of node apparatus. Each node apparatus N transmits a data frame to any gateway apparatus GW. The gateway apparatus GW transmits a data frame to the server via the Internet network. The maintenance terminal HT performs various tests, collection of information, and so forth on an arbitrary node apparatus N. The maintenance terminal HT is also capable of operating an arbitrary node apparatus N.

<Example of the Configuration of the Node Apparatus>

Figure 6:
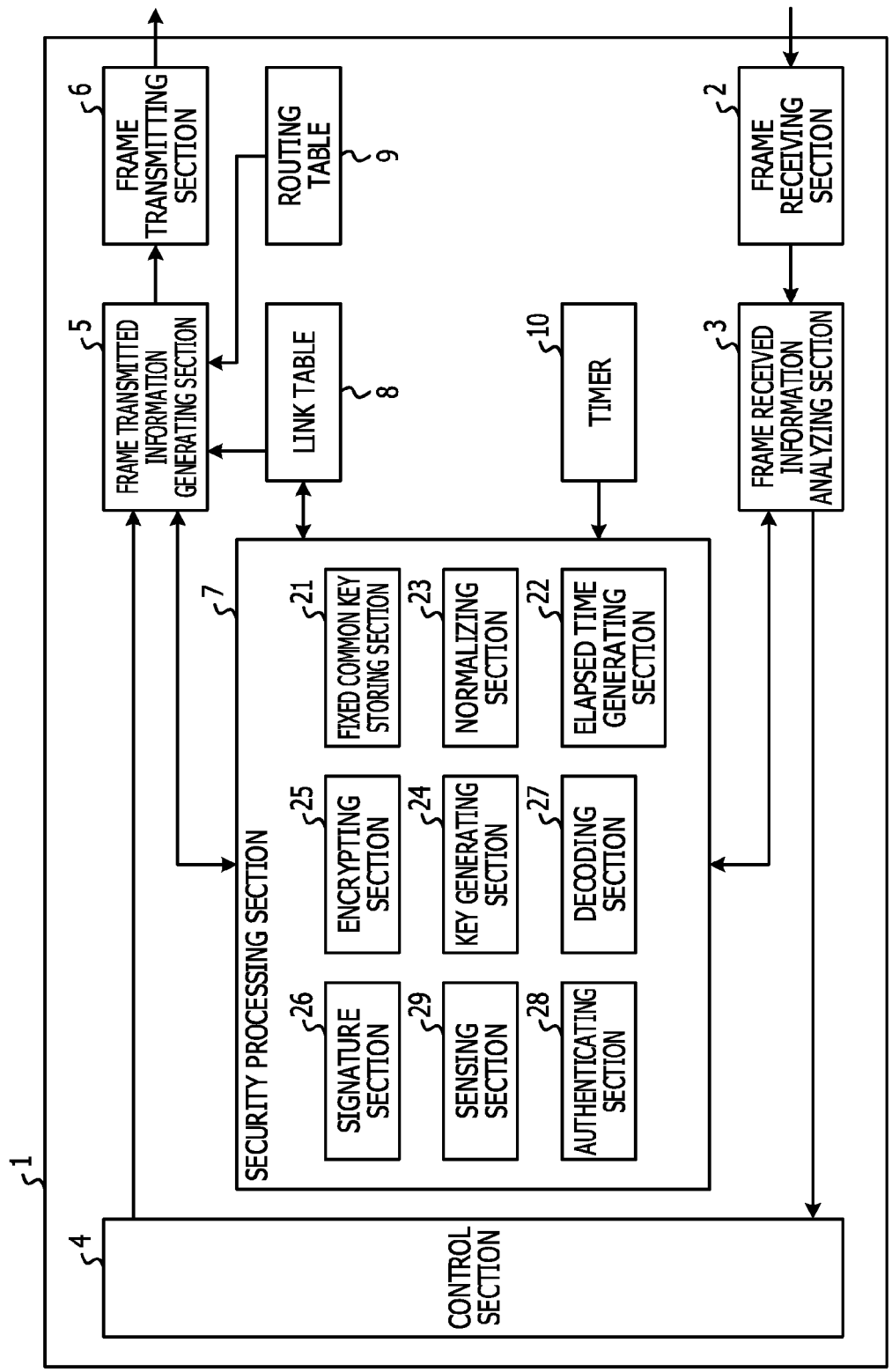
FIG. 6 is a diagram depicting an example of functional blocks of a node apparatus.

FIG. 6 depicts an example of a node apparatus 1. The node apparatus 1 depicted in FIG. 6 as an example includes a frame receiving section 2, a frame received information analyzing section 3, a control section 4, a frame transmitted information generating section 5, a frame transmitting section 6, a security processing section 7, a link table 8, a routing table 9, and a timer 10.

The frame receiving section 2 receives the HELLO frame or the data frame that is transmitted by another node apparatus 1 (including the gateway apparatus and the maintenance terminal) adjacent to the node apparatus 1. The frame receiving section 2 may receive other types of frames. The frame receiving section 2 is an example of a receiving section. Incidentally, the frame is information that is communicated between the adjacent node apparatuses 1.

The frame received information analyzing section 3 analyzes the received frame. Moreover, the frame received information analyzing section 3 performs ad hoc layer termination processing. The frame received information analyzing section 3 outputs the analyzed information to the control section 4 and the security processing section 7.

The control section 4 controls the entirety of the node apparatus 1. Moreover, the control section 4 manages a received frame and a frame to be transmitted. The control section 4 may be implemented by a specific application.

The frame transmitted information generating section 5 processes an ad hoc layer of a frame, the transmission of which is ordered by the control section 4. Moreover, the frame transmitted information generating section 5 determines a node apparatus 1 which is a next destination of the frame by referring to the link table 8 and the routing table 9. The destination node apparatus 1 thus determined is adjacent to the node apparatus 1 to which the frame transmitted information generating section 5 belongs.

The frame transmitting section 6 transmits the HELLO frame or the data frame to the destination node apparatus 1 determined by the frame transmitted information generating section 5. The frame transmitting section 6 may transmit other types of frames. The frame transmitting section 6 is an example of a transmitting section.

The security processing section 7 performs encryption processing on the data frame that is transmitted by the frame transmitting section 6. The data frame that is communicated between the node apparatuses has been subjected to encryption processing. As a result, the confidentiality of the data frame is ensured. Moreover, the security processing section 7 decodes the encrypted frame. In addition, the security processing section 7 performs security processing such as authentication of a signature, management of a fixed common key, and generation of a common key.

The link table 8 stores information concerning a node apparatus adjacent to the node apparatus 1 and information such as the quality of communication between the node apparatuses. The routing table 9 stores information on a channel from the node apparatus 1 to a global destination address GD. Based on the channel information stored in the routing table 9, the node apparatus 1 transmits the data frame to the adjacent node apparatus 1. The timer 10 counts the time.

A local source address LS (local source), a local destination address LD (local destination), a global source address GS (global source), and a global destination address GD (global destination) will be described.

The local source address LS indicates the address of a source node apparatus 1 that transmits a frame. The local destination address LD indicates the address of a next destination node apparatus 1 to which the frame is transmitted. The global source address GS indicates a node apparatus 1 that generates the frame. The global destination address GD indicates a node apparatus 1 which is a final destination of the frame.

Therefore, a node apparatus 1 with the local source address LS and a node apparatus 1 with the local destination address LD are adjacent to each other. On the other hand, a node apparatus 1 with the global source address GS and a node apparatus 1 with the global destination address GD are not necessarily adjacent to each other.

Next, the security processing section 7 will be described. The security processing section 7 includes a fixed common key storing section 21, an elapsed time generating section 22, a normalizing section 23, a key generating section 24, an encrypting section 25, a signature section 26, a decoding section 27, an authenticating section 28, and a sensing section 29. The security processing section 7 may include component elements other than those described above.

The fixed common key storing section 21 stores a common key whose key value does not vary (hereinafter referred to as a fixed common key). Therefore, the degree of confidentiality of the fixed common key is lower than the degree of confidentiality of a common key whose key value varies (hereinafter referred to as a variable common key). However, by performing encryption by using the fixed common key, it is possible to obtain the confidentiality of information. The fixed common key is stored in the fixed common key storing section 21 in advance.

The elapsed time generating section 22 generates the time elapsed after the start-up of the node apparatus 1. As an example, the elapsed time generating section 22 may generate the elapsed time by holding "0" as an initial value and inputting the time which is counted by the timer 10.

The normalizing section 23 normalizes the elapsed time. The time obtained by normalization of the elapsed time is referred to as a normalized time. Moreover, the normalizing section 23 generates an identification number (Key-ID). The identification number corresponds to the normalized time and is used by the node apparatus 1 that has received the data frame in order to determine whether or not to approve decoding of the data frame.

The key generating section 24 generates a variable common key by using, for example, the local destination address LD, the local source address LS, the normalized time, and the fixed common key. By using the variable common key generated by the key generating section 24, the encrypting section 25 encrypts the frame that is transmitted by the node apparatus 1. The signature section 26 provides signature information to the frame to be transmitted.

The decoding section 27 decodes the frame received by the frame receiving section 2 by using the variable common key generated by the key generating section 24. The authenticating section 28 determines whether or not the signature information of the frame received by the frame receiving section 2 is correct. The sensing section 29 judges the reliability of the data frame received by the frame receiving section 2. As an example, the sensing section 29 judges the reliability of the data frame by using the elapsed time contained in the data frame.

<Example of the Configuration of the Data Frame>

Figure 7:
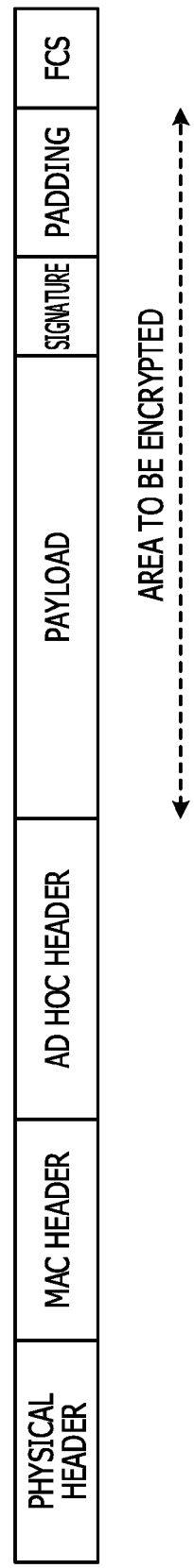
FIG. 7 is a diagram depicting an example of the configuration of a data frame.

FIG. 7 depicts an example of the configuration of the data frame. The data frame of FIG. 7 has a physical header, a MAC header, an ad hoc header, a payload, a signature, padding, and an FCS. A payload portion is body information of the data frame, and the payload portion is encrypted. However, the signature and the padding are also the subjects of encryption.

As an example, when the length of the variable common key is assumed to be 128 bits, the length of only the payload and the signature is sometimes less than 128 bits. In this case, padding is added to the data frame such that the total of the payload, the signature, and the padding becomes equal to the length (128 bits) of the variable common key.

Figure 8:
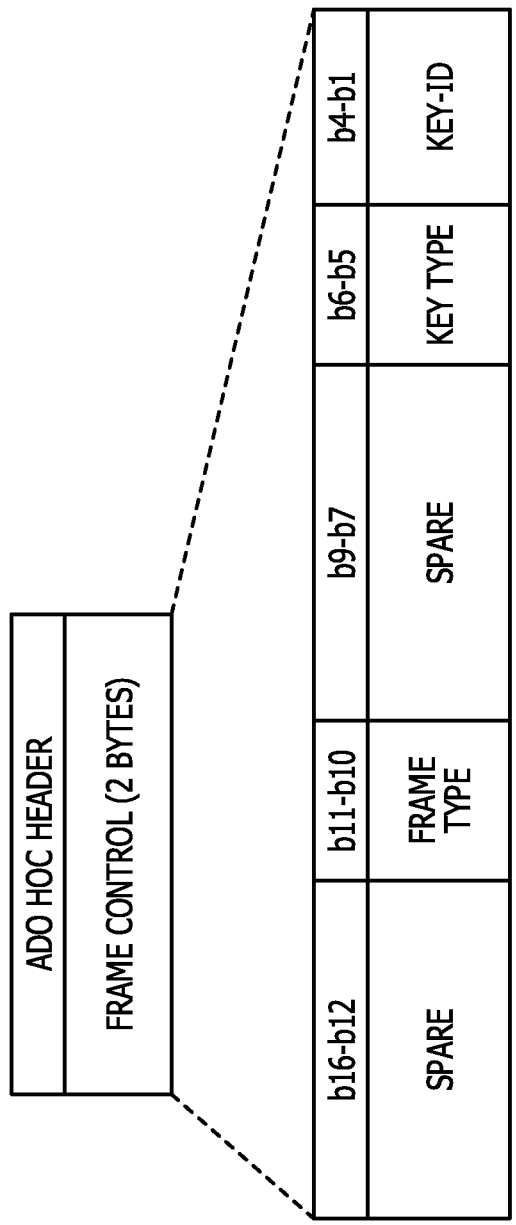
FIG. 8 is a diagram depicting an example of the configuration of an ad hoc header.

Next, the ad hoc header will be described. FIG. 8 depicts an example of the ad hoc header. The ad hoc header is one of the headers of the data frame, and, in the example of FIG. 8, the amount of information is 2 bytes.

The ad hoc header has identification information (Key-ID in FIG. 8), a key type, a frame type, and a spare. Here, b1 of FIG. 8 is the least significant bit and b16 is the most significant bit. In the example of FIG. 8, as the identification number, 4 bit may be used. The items of the ad hoc header are not limited to the items in the example of FIG. 8.

FIG. 9 describes an example of each item of the ad hoc header. In the embodiment, the items of the key type and the identification number (Key-ID) are used. The key type indicates an example of the type of common key. In the example of FIG. 9, 2 bits are assigned to the key type.

The key type "0x00" indicates that this is a fixed common key. The key type "0x01" indicates that this is a variable common key of LD. The variable common key of LD is a variable common key that is generated by using the elapsed time of a node apparatus 1 with a local destination address LD. The key type "0x02" indicates that this is a variable common key of LS. The variable common key of LS is a variable common key that is generated by using the elapsed time of the node apparatus 1 with the local source address LS. The key type "0x03" indicates that this is a spare.

The identification number (Key-ID) indicates that this is a value calculated from the elapsed time. As described earlier, the identification number corresponds to the normalized time. In the example depicted in FIG. 9, 4 bits are assigned to the identification number. Therefore, the identification number may express values from 0 to 15.

<Example of the Link Table Structure>

Next, with reference to FIG. 10, an example of the structure of the link table 8 of the node apparatus 1 will be described. The link table 8 depicted in FIG. 10 as an example has items of the local source address LS and the elapsed time. The items of the link table 8 are not limited to the items of the example depicted in FIG. 10. The link table 8 may have other items. When the node apparatus 1 receives a HELLO frame, the local source address LS indicates the address of the node apparatus 1 that has transmitted the HELLO frame. On the other hand, when a data frame is transmitted, the local source address LS of the link table 8 is the local destination address LD.

The local source address LS of the link table 8 may be obtained based on the information contained in the HELLO frame when the node apparatus 1 receives the HELLO frame from an adjacent node apparatus 1. The elapsed time may be obtained based on the information contained in the HELLO frame or the data frame when the node apparatus 1 receives the HELLO frame or the data frame from an adjacent node apparatus 1.

<Example of Generation of the Variable Common Key>

Next, with reference to FIGS. 11 and 12, an example in which the variable common key is generated will be described. The key generating section 24 generates the variable common key by using the local source address LS, the local destination address LD, and the normalized time.

A method for generating the variable common key differs depending on whether or not the number of bytes of all data on which encryption is to be performed is equal to the number of bytes of the variable common key. FIG. 11 depicts a case in which the number of bytes of all data on which encryption is to be performed is different from the number of bytes of the variable common key, and FIG. 12 depicts a case in which the number of bytes of all data on which encryption is to be performed is equal to the number of bytes of the variable common key.

Figure 11:
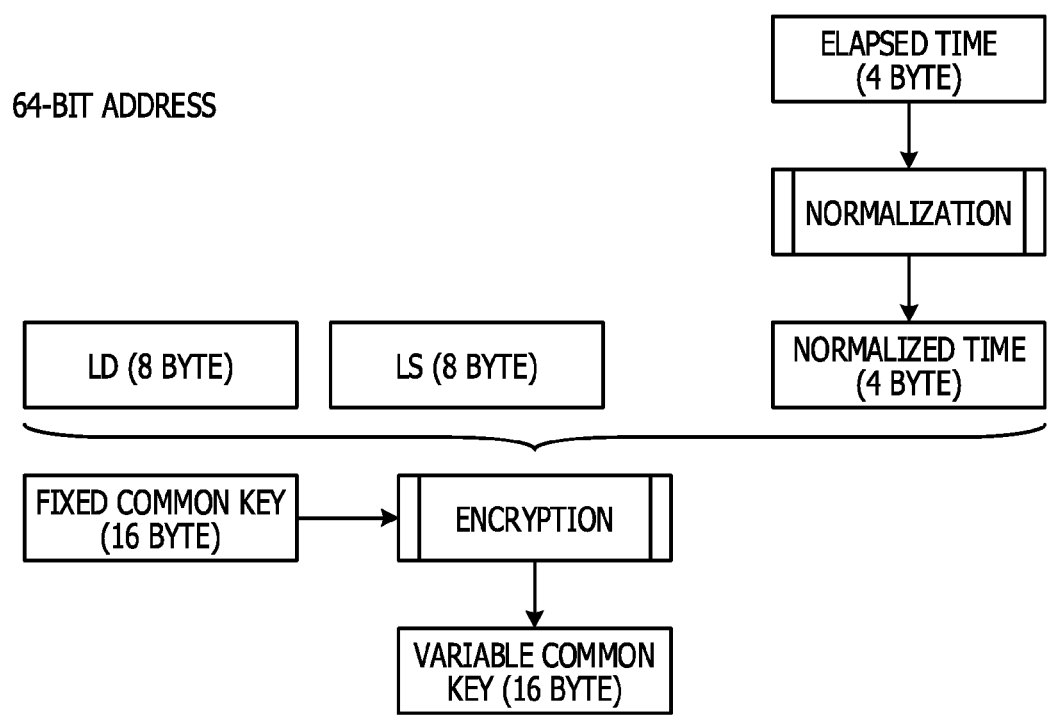
FIG. 11 is a diagram (I) describing an example in which a variable common key is generated.

In the example depicted in FIG. 11, it is assumed that the local source address LS and the local destination address LD are expressed as 64 bits (=8 bytes) (64-bit address). On the other hand, in the example depicted in FIG. 12, it is assumed that the local source address LS and the local destination address LD are expressed as 16 bits (=2 bytes).

With reference to FIG. 11, a method for generating the variable common key when the local source address LS and the local destination address LD are expressed as 64 bits will be described. The normalizing section 23 obtains the elapsed time that is generated by the elapsed time generating section 22. As an example, it is assumed that the elapsed time is expressed as 4 bytes.

The normalizing section 23 normalizes the obtained elapsed time. The time normalized by the normalizing section 23 is referred to as a normalized time. As an example, it is assumed that the normalized time is also expressed as 4 bytes. The key generating section 24 obtains the local source address LS and the local destination address LD which are contained in the MAC header of the frame received by the frame receiving section 2.

The key generating section 24 couples the local source address LS and the local destination address LD. The amount of information of the data obtained by coupling is 16 bytes (=8 bytes+8 bytes). When the normalized time (=4 bytes) is added to the data obtained by coupling the local source address LS and the local destination address LD, the amount of information becomes 20 bytes in total.

Since the variable common key is 16 bytes, it is preferable that data to be encrypted is also 16 bytes. Thus, the key generating section 24 XORs the high 4-byte information of the data obtained by coupling the local source address LS and the local destination address LD and the 4-byte information of the normalized time.

As a result, the data to be encrypted becomes 16 bytes. This 16-byte data contains the normalized time. The key generating section 24 obtains the fixed common key from the fixed common key storing section 21 and performs encryption on the value of the result of the XOR by using the fixed common key. As a result, the variable common key is generated.

The variable common key is a common key whose key value varies. The key generating section 24 uses the normalized time when generating the variable common key. The normalized time is the time obtained by normalizing the elapsed time. The elapsed time varies every time the time elapses based on the value counted by the timer 10. The normalized time varies in response to the elapsed time.

Since the key generating section 24 generates the variable common key by using the normalized time that varies in response to the elapsed time, the value of the variable common key varies in response to a lapse of the time. Therefore, it is possible to encrypt a specific area of the frame with a high degree of confidentiality by using the variable common key.

Moreover, the key generating section 24 XORs the high 4-byte information of the data obtained by coupling the local source address LS and the local destination address LD and the 4-byte information of the normalized time. As a result, it is possible to further enhance the confidentiality of the variable common key.

In the embodiment, the key generating section 24 generates the variable common key by performing encryption with the fixed common key by using the local source address LS, the local destination address LD, and the normalized time. As long as it is possible to generate the variable common key, the key generating section 24 does not have to use the fixed common key.

However, by generating the variable common key by using the fixed common key, it is possible to generate a high-security variable common key. Therefore, it is preferable that the key generating section 24 generates the variable common key by using the fixed common key.

Moreover, although the key generating section 24 generates the variable common key by performing encryption by using the local source address LS, the local destination address LD, and the normalized time, the generation of the variable common key is not limited to this example.

Next, with reference to FIG. 12, a case in which the local source address LS and the local destination address LD which are contained in a frame are 16 bits will be described. When the address is expressed as 16 bits, there is a possibility that the same address is assigned to different node apparatuses 1.

Figure 12:
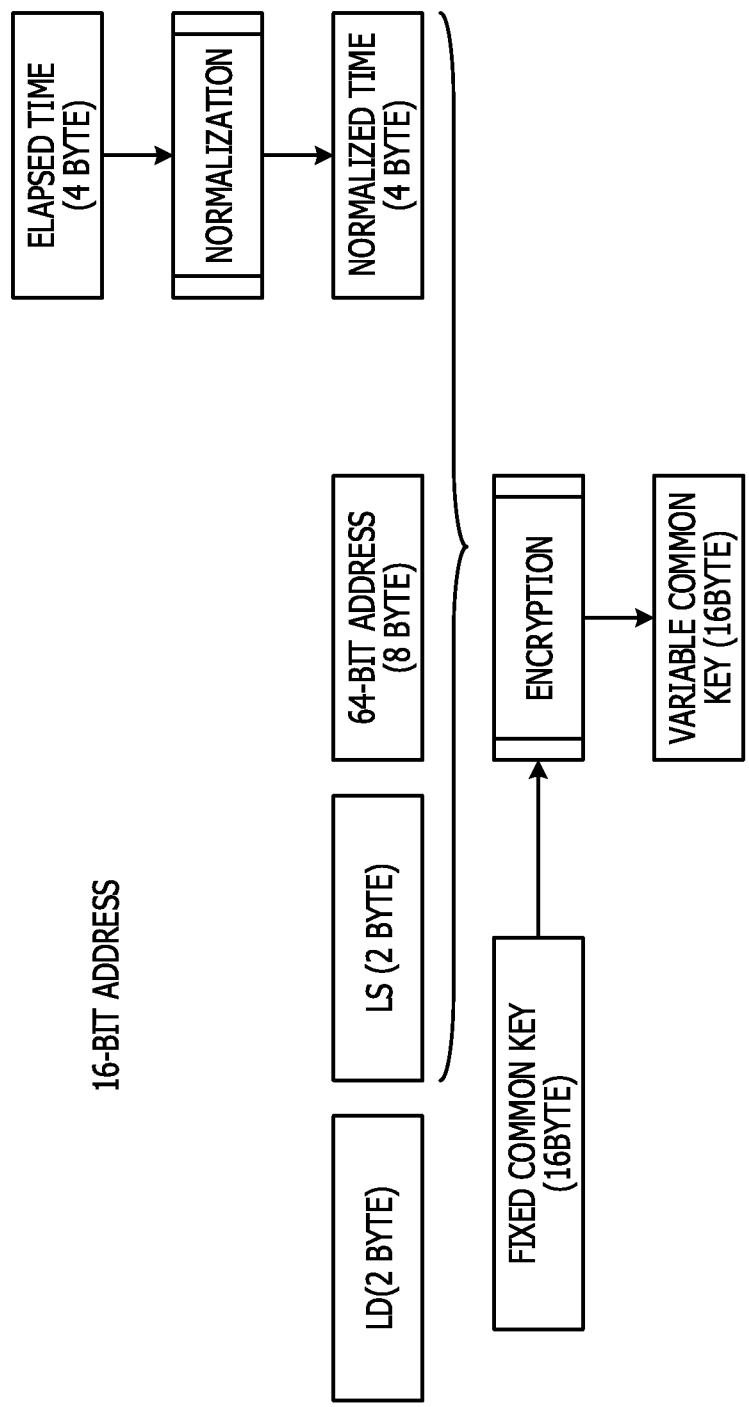
FIG. 12 is a diagram (II) describing an example in which a variable common key is generated.

Thus, as depicted in FIG. 12, the key generating section 24 uses a 64-bit address. This 64-bit address is information in which the address of any one of the local source address LS and the local destination address LD is expressed as 64 bits.

When the variable common key is generated by using the elapsed time of the local source address LS (when the key type is LS), the 64-bit address of the local source address LS is used. When the variable common key is generated by using the elapsed time of the local destination address LD (when the key type is LD), the 64-bit address of the local destination address LD is used.

As depicted in FIG. 12, the key generating section 24 couples the 2-byte local source address LS, the 2-byte local destination address LD, and the 64-bit address (8 bytes). The data obtained by coupling is 16 bytes which is same as the variable common key.

Therefore, the above-described XOR is not indispensable. However, to further enhance the confidentiality, the high 4-byte information of the data obtained by coupling and the 4-byte information of the normalized time may be XORed. Moreover, the data obtained by coupling may not have the same number of bytes as the variable common key.

<Example of Processing Performed by the Node Apparatus>

Next, with reference to FIG. 13, an example of processing performed by the node apparatus 1 will be described. In FIG. 13, processing performed by a node apparatus on the data frame transmission side and processing performed by a node apparatus on the data frame reception side will be described separately. The elapsed time generating section 22 generates the time (the elapsed time) elapsed after the start-up of the node apparatus 1 based on the time that is measured by the timer 10 (step S1).

The signature section 26 calculates the signature and provides the signature to a data frame (step S2). As described earlier, when the total number of bits of the payload, the signature, and the padding of the data frame is made equal to the number of bits of the variable common key, the number of bits of the padding is calculated. The padding with the calculated number of bits is added to the data frame (step S3).

Incidentally, depending on the method of encryption, as the total number of bits of the payload, the signature, and the padding of the data frame, a value that is dividable by the number of bits of the variable common key may be adopted. Moreover, depending on the method of encryption, the total number of bits of the payload, the signature, and the padding of the data frame may be arbitrarily set.

The encrypting section 25 encrypts the areas of the payload, the signature, and the padding of the data frame (step S4). Moreover, the frame transmitted information generating section 5 designates the key type of the frame. The portion to be encrypted is not limited to the payload, the signature, and the padding.

When the encrypting section 25 performs encryption by using the elapsed time of the local destination address LD, the key type is LD. When the encrypting section 25 performs encryption by using the elapsed time of the node apparatus 1 to which the encrypting section 25 belongs, the key type is LS. That is, when encryption is performed without using the elapsed time of the local destination address LD, the key type is LS.

The frame transmitting section 6 transmits the data frame which contains the encrypted payload and whose key type is designated, to the node apparatus on the reception side (step S5). The node apparatus on the reception side receives the data frame containing the key type (step S6).

The decoding section 27 of the node apparatus on the reception side decodes the received frame (step S7). The decoding section 27 performs decoding by different methods depending on the key type contained in the frame. Then, the padding of the decoded frame is checked (step S8).

The signature section 26 calculates the signature of the received frame and performs checking (step S9). Then, the sensing section 29 senses spoofing (step S10). It is possible to sense spoofing based on the information on the elapsed time contained in the frame.

Figure 14A:
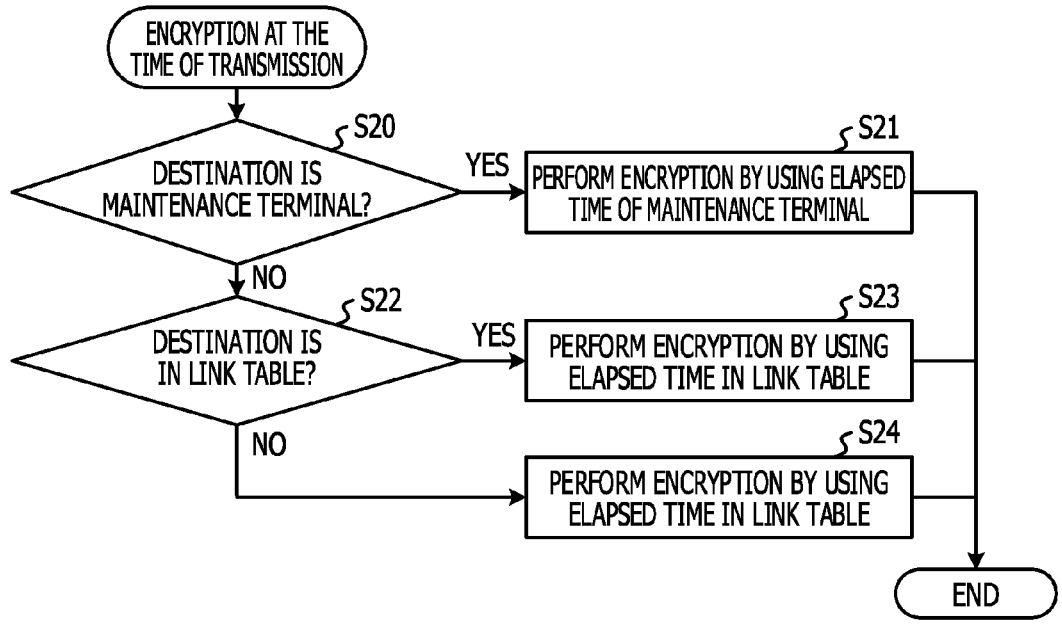
FIGS. 14A and 14B are flowcharts describing examples of processing of encryption and decoding.

Next, by using FIG. 14A, an example of encryption which is performed when a frame is transmitted will be described. The key generating section 24 determines whether or not the local destination address LD is a maintenance terminal (step S20). If the destination is a maintenance terminal (YES in step S20), encryption is performed by using the elapsed time of the maintenance terminal (step S21). The details of the maintenance terminal will be described later.

If the destination is not a maintenance terminal (No in step S20), the key generating section 24 determines whether or not the information on the elapsed time of a destination node apparatus 1 is in the link table (step S22). Here, the link table 8 includes an item of the local source address LS. When the frame is a HELLO frame, this item indicates the local source address LS; when the frame is a data frame, this item indicates the local destination address LD.

When the node apparatus 1 receives the HELLO frame or the data frame containing the elapsed time from the destination node apparatus 1, the node apparatus 1 that has received the HELLO frame or the data frame stores the elapsed time of the destination node apparatus 1 in the link table 8.

Therefore, if the elapsed time of the destination node apparatus 1 is stored in the link table 8 of the node apparatus 1 to which the key generating section 24 belongs (YES in step S22), the key generating section 24 generates the variable common key by using the stored elapsed time (step S23). The key type of this variable common key is LD.

That is, the key generating section 24 generates the variable common key by performing encryption by using the elapsed time of the node apparatus (the local destination address LD) 1 to which the frame is to be transmitted. However, when the key generating section 24 performs encryption, the elapsed time of the local destination address LD is not the only subject of encryption performed by the key generating section 24. The key generating section 24 encrypts the time obtained by adding, to the elapsed time of the local destination address LD, the time elapsed from the time point at which a notification of the elapsed time of the local destination address LD was made.

If the node apparatus 1 has never received the HELLO frame and the data frame which contain the elapsed time of the destination node apparatus 1, the link table 8 does not store the elapsed time of the destination node apparatus (NO in step S22). Therefore, in this case, the key generating section 24 of the node apparatus 1 performs encryption by using the elapsed time of the node apparatus 1 to which the key generating section 24 belongs and generates the variable common key (step S24). The key type of this variable common key is LS.

Figure 14B:
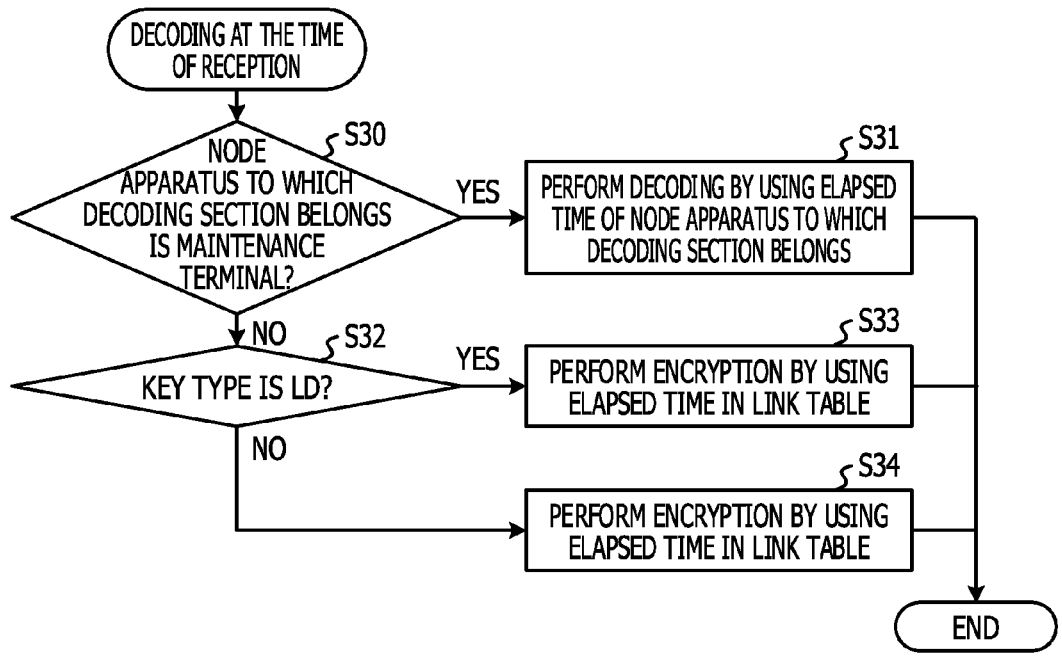

Next, by using FIG. 14B, an example of decoding that is performed when a frame is received will be described. The decoding section 27 determines whether or not the node apparatus 1 to which the decoding section 27 belongs is a maintenance terminal (step S30).

If the node apparatus 1 to which the decoding section 27 belongs is a maintenance terminal (YES in step S30), the key generating section 24 generates the variable common key by using the elapsed time of the node apparatus 1 to which the decoding section 27 belongs. Then, the decoding section 27 decodes the encrypted portion of the received frame by using the variable common key generated by the key generating section 24 (step S31).

If the node apparatus 1 to which the decoding section 27 belongs is not a maintenance terminal (NO in step S30), the decoding section 27 determines whether or not the key type of the received data frame is LD (step S32). If the key type of the received data frame is LD (YES in step S32), the key generating section 24 generates the variable common key by using the elapsed time of the node apparatus 1 to which the decoding section 27 belongs. The decoding section 27 decodes the encrypted portion of the received frame by using the variable common key generated by the key generating section 24 (step S33).

On the other hand, if the key type of the received data frame is not LD (NO in step S32), the key type of the data frame is LS. In this case, the key generating section 24 generates the variable common key by using the elapsed time of the node apparatus 1 with the local source address LS, the elapsed time stored in the link table 8 of the node apparatus 1 to which the key generating section 24 belongs.

Therefore, the key generating section 24 adds, to the elapsed time stored in the link table 8, the time elapsed after a notification of the elapsed time of the node apparatus 1 with the local source address LS was made. A key obtained by encrypting the elapsed time obtained by addition by using the normalized time is the variable common key. The decoding section 27 decodes the encrypted portion of the received frame by using this variable common key (step S34).

Therefore, depending on the key type, the method for decoding the data frame received by the node apparatus 1 differs. When the key type is LD, the key generating section 24 generates the variable common key by using the elapsed time of the node apparatus 1 to which the key generating section 24 belongs; when the key type is LS, the key generating section 24 generates the variable common key by using the elapsed time of the local source address LS.

<Example of an Internode Sequence>

Figure 15:
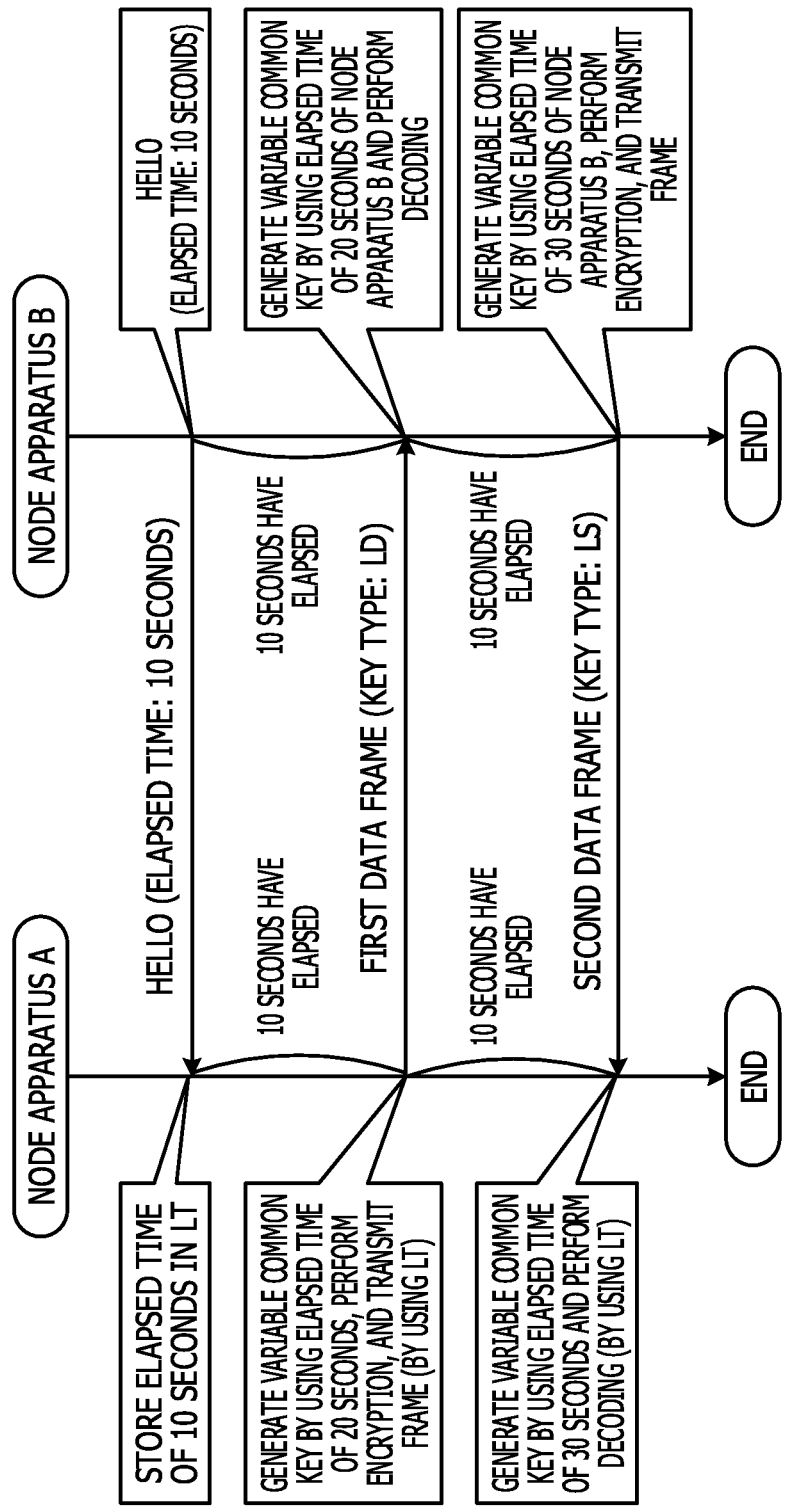
FIG. 15 is a diagram describing an example in which a data frame is transmitted and received between two node apparatuses.

Next, with reference to FIG. 15, an example of an internode sequence will be described. A node apparatus A and a node apparatus B which are depicted in FIG. 15 are adjacent to each other. As an example, it is assumed that the time elapsed after the start-up of the node apparatus B is 10 seconds. Moreover, it is assumed that, until the first 10 seconds elapse, a HELLO frame is not communicated between the node apparatus A and the node apparatus B. The node apparatus A is an example of a first node apparatus. The node apparatus B is an example of a second node apparatus.

The node apparatus B transmits a HELLO frame to the node apparatus A. The node apparatus B adds, to the HELLO frame, information indicating that the time elapsed after the start-up of the node apparatus B (the elapsed time) is 10 seconds. As a result, the node apparatus A is notified of the elapsed time of the node apparatus B.

The frame receiving section 2 of the node apparatus A receives the HELLO frame. The frame received information analyzing section 3 recognizes that the start-up time of the node apparatus B is 10 seconds based on the HELLO frame. This time of 10 seconds is the elapsed time at a time point at which the node apparatus A was notified by the node apparatus B.

In the item of the local source address LS of the link table ("LT" in FIG. 8) 8, the address of the node apparatus B is stored, and, at the same time, the information indicating that the elapsed time of the local source address LS is 10 seconds is stored.

In the example depicted in FIG. 15, the node apparatus A transmits a data frame (a first data frame) to the node apparatus B. It is assumed that the time from the reception of the HELLO frame by the node apparatus A to the transmission of the first data frame by the node apparatus A is 10 seconds. This time may be obtained from the timer 10.

Therefore, the elapsed time when the node apparatus A transmits the first data frame is 20 seconds (=10 seconds+10 seconds). The key generating section 24 generates the variable common key by performing encryption based on the elapsed time of 20 seconds. This variable common key is a key obtained as a result of encryption having been performed by using the elapsed time of the link table 8. That is, since this variable common key is a key obtained as a result of encryption having been performed by using the elapsed time of the node apparatus B with which communication is performed, the key type is LD.

The encrypting section 25 of the node apparatus A encrypts a specific portion containing the payload of the first data frame by using the variable common key generated based on the elapsed time of 20 seconds. A key type LD is set in the first data frame on which encryption has been performed.

The frame transmitting section 6 of the node apparatus A transmits the first data frame whose key type is LD to the node apparatus B. The frame receiving section 2 of the node apparatus B receives the first data frame. Since the key type of the first data frame is LD, the key generating section 24 of the node apparatus B generates the variable common key by using the elapsed time of the node apparatus B.

The elapsed time elapsed after the start-up of the node apparatus B is 20 seconds. Therefore, the key generating section 24 generates the variable common key with the elapsed time of 20 seconds. Then, the decoding section 27 decodes the encrypted portion of the first data frame by using the generated variable common key.

At this time, the specific portion of the first data frame containing the payload has been encrypted by the variable common key with the elapsed time of 20 seconds. Then, the key generating section 24 of the node apparatus B also generates the variable common key with the elapsed time of 20 seconds, and the decoding section 27 performs decoding by using this variable common key. Thus, the variable common key based on which encryption has been performed and the variable common key based on which decoding is performed are generated by using the common value of 20 seconds. This makes it possible for the decoding section 27 to decode the first data frame.

In the example depicted in FIG. 15, after a lapse of 10 seconds from the decoding of the first data frame performed by the decoding section 27, the node apparatus B transmits a second data frame to the node apparatus A. The node apparatus B has not received the HELLO frame from the node apparatus A. As a result, the node apparatus B has not received a notification of the elapsed time elapsed after the start-up of the node apparatus A.

Therefore, the key generating section 24 generates the variable common key by using the elapsed time of the node apparatus B to which the key generating section 24 belongs. The elapsed time of the node apparatus B is 30 seconds (=10 seconds+10 seconds+10 seconds). Thus, the key generating section 24 generates the variable common key by using the elapsed time: 30 second of the node apparatus B. Then, the encrypting section 25 encrypts a specific portion of the second data frame containing the payload by using this variable common key.

A key type is set in the second data frame on which encryption has been performed. The key type is LS. The reason why the key type is LS is that the encryption is performed by using the elapsed time of the node apparatus B to which the key generating section 24 belongs, not using the elapsed time of the destination node apparatus A.

The frame transmitting section 6 of the node apparatus B transmits the second data frame to the node apparatus A. The frame receiving section 2 of the node apparatus A receives the second data frame. Since the key type is LS, the key generating section 24 of the node apparatus A uses the time of 10 seconds stored in the link table 8.

In the link table 8 of the node apparatus A, the elapsed time, 10 seconds of the node apparatus B, is stored. Therefore, the node apparatus A recognizes the elapsed time of the node apparatus with which communication is being performed. In addition, 20 seconds (=10 seconds+10 seconds) has elapsed after the node apparatus A received the HELLO frame.

This time of 20 seconds may be obtained from the timer 10. Therefore, the key generating section 24 adds the time of 20 seconds elapsed after the reception of the HELLO frame to the time of 10 seconds stored in the link table 8. Thus, the elapsed time used to generate the variable common key is 30 seconds (=10 seconds+20 seconds).

The key generating section 24 generates the variable common key by using the time of 30 seconds. The decoding section 27 decodes the encrypted portion of the second data frame by using the generated variable common key.

The specific portion of the second data frame containing the payload is encrypted by the variable common key generated by using the elapsed time of 30 seconds. Moreover, the key generating section 24 of the node apparatus A generates the variable common key by using the elapsed time of 30 seconds, and the decoding section 27 decodes the encrypted portion of the second data frame by using this variable common key.

Thus, the elapsed time (30 seconds) used to generate the variable common key based on which encryption is performed and the elapsed time (30 seconds) used to generate the variable common key based on which decoding is performed are the same time. This makes it possible for the decoding section 27 to decode the encrypted portion of the second data frame.

Therefore, it is possible to communicate a frame between the node apparatus A and the node apparatus B with a high degree of confidentiality. In the embodiment, a data frame is encrypted by generating the variable common key by using the elapsed time after the start-up of a node apparatus at the other end between the adjacent node apparatuses. Between node apparatuses which are completely different from the node apparatus A and the node apparatus B, a variable common key using a different elapsed time is used.

The ad hoc network is formed of a plurality of node apparatuses, and, between the node apparatuses which are different from the node apparatus A and the node apparatus B, a data frame is encrypted by a variable common key which is different from the variable common key used by the node apparatus A and the node apparatus B. Between the two node apparatuses of the ad hoc network, a specific portion of a data frame is encrypted by a unique variable common key.

It may be possible for all the node apparatuses forming the ad hoc network to perform encryption by using the same variable common key, but, by making two node apparatuses that perform communication encrypt a data frame by using a unique variable common key, it is possible to enhance the confidentiality of communication.

Moreover, when encryption and decoding of a data frame are performed, since the elapsed time of a node apparatus 1 at the other end is used, special hardware to make two node apparatuses 1 share a variable common key does not have to be provided. Therefore, the hardware resources are not increased.

<Example of Normalization of the Elapsed Time>

Next, with reference to FIGS. 16A and 16B, an example of normalization of the elapsed time will be described. As described earlier, when a frame is communicated between the adjacent node apparatuses, encryption is performed by using the elapsed time of a node apparatus at the other end.

In the example of FIG. 15, the HELLO frame contains the elapsed time of the destination node apparatus B. By receiving the HELLO frame, the node apparatus A is capable of recognizing the elapsed time of the node apparatus B. Then, the node apparatus A performs encryption and decoding by using the elapsed time of the node apparatus B.

When the node apparatus B transmits the HELLO frame, a specific time elapses before the HELLO frame reaches the node apparatus A. This time is a delay time. The elapsed time used at the time of generation of the variable common key is used with no consideration given to the delay time. Therefore, a difference is produced between the elapsed time of the node apparatus A and the elapsed time of the node apparatus B.

Thus, in the embodiment, the normalizing section 23 normalizes the elapsed time with a low degree of granularity. In FIG. 16A, an example of normalization of the elapsed time is depicted. In the example depicted in FIG. 16A, the elapsed time is normalized in units of 10 seconds (sec). As an example, normalization may be performed in unit of variable common key update intervals.

As described earlier, the HELLO frame has an elapsed time and an identification number. The identification number is generated in such a way as to correspond to a normalized time. In the example depicted in FIG. 16A, the identification number (Key-ID) is incremented with the normalized time. However, the identification number is reduced to zero when the identification number becomes a multiple of 16. In the example of FIG. 16A, a number at which the identification number is reduced to zero is not limited to a multiple of 16.

The HELLO frame has the elapsed time that is generated by the elapsed time generating section 22 and the identification number that is generated by the normalizing section 23. This HELLO frame is transmitted to a node apparatus 1 with a local destination address LD from a node apparatus 1 with a local source address LS.

A tolerance will be described. The tolerance is used as a standard indicating whether or not to allow the node apparatus 1 with the local destination address LD to receive the data frame transmitted by the node apparatus 1 with the local source address LS.

As described earlier, a difference is sometimes produced between the elapsed time of the node apparatus 1 with the local source address LS and the elapsed time of the node apparatus 1 with the local destination address LD. As an example, when the elapsed time of the node apparatus 1 with the local source address LS is 19, the normalized time is 1.

On the other hand, when the elapsed time of the node apparatus 1 with the local destination address LD is 20, the normalized time is 2. Thus, the normalized time of the node apparatus 1 with the local source address LS does not coincide with the normalized time of the node apparatus 1 with the local destination address LD.

Therefore, with consideration given to the time at which the normalized time obtained by normalizing the elapsed time is switched, normalized times before and after the normalized time and identification numbers thereof are tolerated. As an example, if the normalized time is 2, not only a normalized time of 2 but also normalized times of 1 and 3 are also tolerated. That is, a normalized time which is greater than the normalized time by 1 and a normalized time which is smaller than the normalized time by 1 are tolerated.

Figure 16:
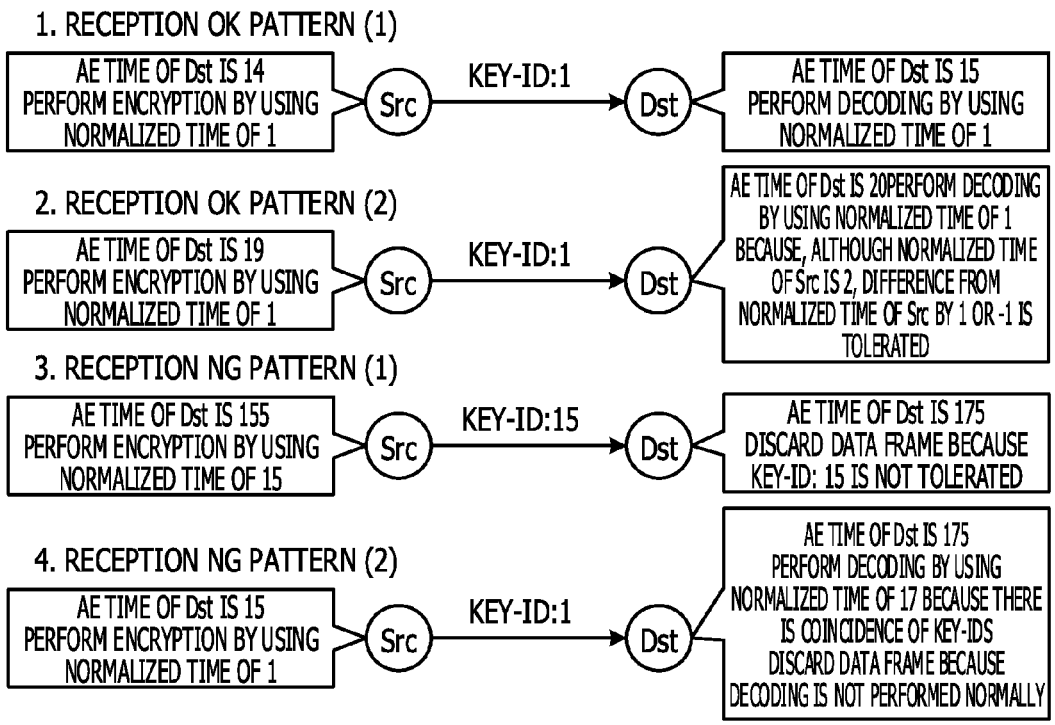
FIGS. 16A and 16B are diagrams describing an example in which an elapsed time is normalized.

FIG. 16B depicts an example in which the node apparatus 1 with the local destination address LD is allowed to receive the data frame transmitted by the node apparatus 1 with the local source address LS. In FIG. 16B, "Src" denotes the node apparatus 1 with the local source address LS and "Dst" denotes the node apparatus 1 with the local destination address LD.

In a first pattern of FIG. 16B, an example in which the node apparatus 1 which is Dst normally receives the data frame is depicted. The node apparatus 1 which is Src recognizes that the elapsed time of the node apparatus 1 which is Dst is 14 seconds. Therefore, the normalized time obtained by normalization performed by the normalizing section 23 of the node apparatus 1 which is Src is 1.

Thus, the key generating section 24 of the node apparatus 1 which is Src generates the variable common key by using 1 which is the normalized time. The encrypting section 25 encrypts a portion of the data frame containing the payload by using the variable common key. The frame transmitting section 6 transmits the data frame containing 1 which is the identification number to the node apparatus 1 which is Dst.

On the other hand, the elapsed time of the node apparatus 1 which is Dst is 15 seconds. Although this elapsed time differs from the elapsed time recognized by the node apparatus 1 which is Src by 1 second, the normalized time is 1. The frame receiving section 2 of the node apparatus 1 which is Dst receives the data frame from the node apparatus 1 which is Src. The received data frame contains 1 which is the identification number.

The identification number of the received data frame coincides with the normalized time obtained by normalization performed by the node apparatus 1 which is Dst. Thus, the node apparatus 1 which is Dst approves the data frame. Then, the node apparatus 1 which is Dst decodes the encrypted portion of the received data frame by using the variable common key generated by using 1 which is the normalized time.

Also in a second pattern of FIG. 16B, an example in which the node apparatus 1 which is Dst is allowed to receive the data frame is depicted. The node apparatus 1 which is Src recognizes that the elapsed time of the node apparatus 1 which is Dst is 19 seconds. Therefore, the normalized time obtained by normalization performed by the normalizing section 23 of the node apparatus 1 which is Src is 2.

Thus, the key generating section 24 of the node apparatus 1 which is Src generates the variable common key by using 2 which is the normalized time. The encrypting section 25 encrypts a portion of the data frame containing the payload by using the variable common key. The frame transmitting section 6 transmits the data frame containing 2 which is the identification number to the node apparatus 1 which is Dst.

On the other hand, the elapsed time of the node apparatus 1 which is Dst is 20 seconds. As is the case with the example of the first pattern described above, this elapsed time differs from the elapsed time recognized by the node apparatus 1 which is Src by 1 second. However, when the elapsed time of 20 seconds is normalized, the normalized time is 2. The frame receiving section 2 of the node apparatus 1 which is Dst receives the data frame from the node apparatus 1 which is Src. The received data frame contains 1 which is the identification number.

Since the identification number of the received data frame is 1 and the normalized time obtained by normalization performed by the node apparatus 1 which is Dst is 2, this normalized time is greater than the normalized time of Src by 1. However, as described earlier, a difference from the normalized time of Src by 1 or −1 is tolerated. Therefore, the node apparatus 1 which is Dst approves the data frame.

At this time, the node apparatus 1 which is Dst generates the variable common key by using 1 which is the identification number of the received data frame, not 2 which is the normalized time recognized thereby. The decoding section 27 decodes the encrypted portion of the received data frame by using the generated variable common key.

In a third pattern of FIG. 16B, an example in which the node apparatus 1 which is Dst does not permit reception of the data frame is depicted. The node apparatus 1 which is Src recognizes that the elapsed time of the node apparatus 1 which is Dst is 155 seconds. The normalized time obtained by normalization performed by the normalizing section 23 of the node apparatus 1 which is Src is 15.

Therefore, the key generating section 24 of the node apparatus 1 which is Src generates the variable common key by using 15 which is the normalized time. The encrypting section 25 encrypts a portion of the data frame containing the payload by using the variable common key. The frame transmitting section 6 transmits the data frame containing 15 which is the identification number to the node apparatus 1 which is Dst.

On the other hand, since the elapsed time of the node apparatus 1 which is Dst is 175 seconds, when the elapsed time of 175 seconds is normalized, the normalized time is 17. The frame receiving section 2 of the node apparatus 1 which is Dst receives the data frame from the node apparatus 1 which is Src. The received data frame contains 15 which is the identification number.

The identification number of the received data frame is 15, and the normalized time obtained by normalization performed by the node apparatus 1 which is Dst is 17. Therefore, the normalized time obtained by normalization performed by the node apparatus 1 which is Dst is greater than 15 which is the identification number of the received data frame by 2. Thus, the node apparatus 1 which is Dst does not approve the data frame transmitted by the node apparatus 1 which is Src. In this case, the data frame transmitted by the node apparatus 1 which is Src is discarded.

Also in a fourth pattern of FIG. 16B, an example in which the node apparatus 1 which is Dst does not permit reception of the data frame is depicted. The node apparatus 1 which is Src recognizes that the elapsed time of the node apparatus 1 which is Dst is 15 seconds. Therefore, the normalized time obtained by normalization performed by the normalizing section 23 of the node apparatus 1 which is Src is 1.

Therefore, the key generating section 24 of the node apparatus 1 which is Src generates the variable common key by using 15 which is the normalized time. The encrypting section 25 encrypts a portion of the data frame containing the payload by using the variable common key. The frame transmitting section 6 transmits the data frame containing 1 which is the identification number to the node apparatus 1 which is Dst.

On the other hand, since the elapsed time of the node apparatus 1 which is Dst is 175 seconds, when the elapsed time of 175 seconds is normalized, the normalized time is 17. The identification number of the received data frame is 1, and the normalized time obtained by normalization performed by the node apparatus 1 which is Dst is 17. As depicted in FIG. 16A, the identification number corresponding to 17 which is the normalized time is 1. Thus, there is a normal correlation between the normalized time and the identification number.

The node apparatus 1 which is Dst decodes the encrypted portion of the data frame transmitted by the node apparatus 1 which is Src. At this time, the node apparatus 1 which is Dst decodes the encrypted portion of the received data frame by using the variable common key generated by using 17 which is the normalized time.

However, the node apparatus 1 which is Src has performed encryption by using the variable common key generated by using 1 which is the normalized time. Therefore, the data frame received by the node apparatus 1 which is Dst is not decoded normally. As a result, the node apparatus 1 which is Dst does not approve the received data frame. Thus, the data frame is discarded.

First Application Example

Figure 17:
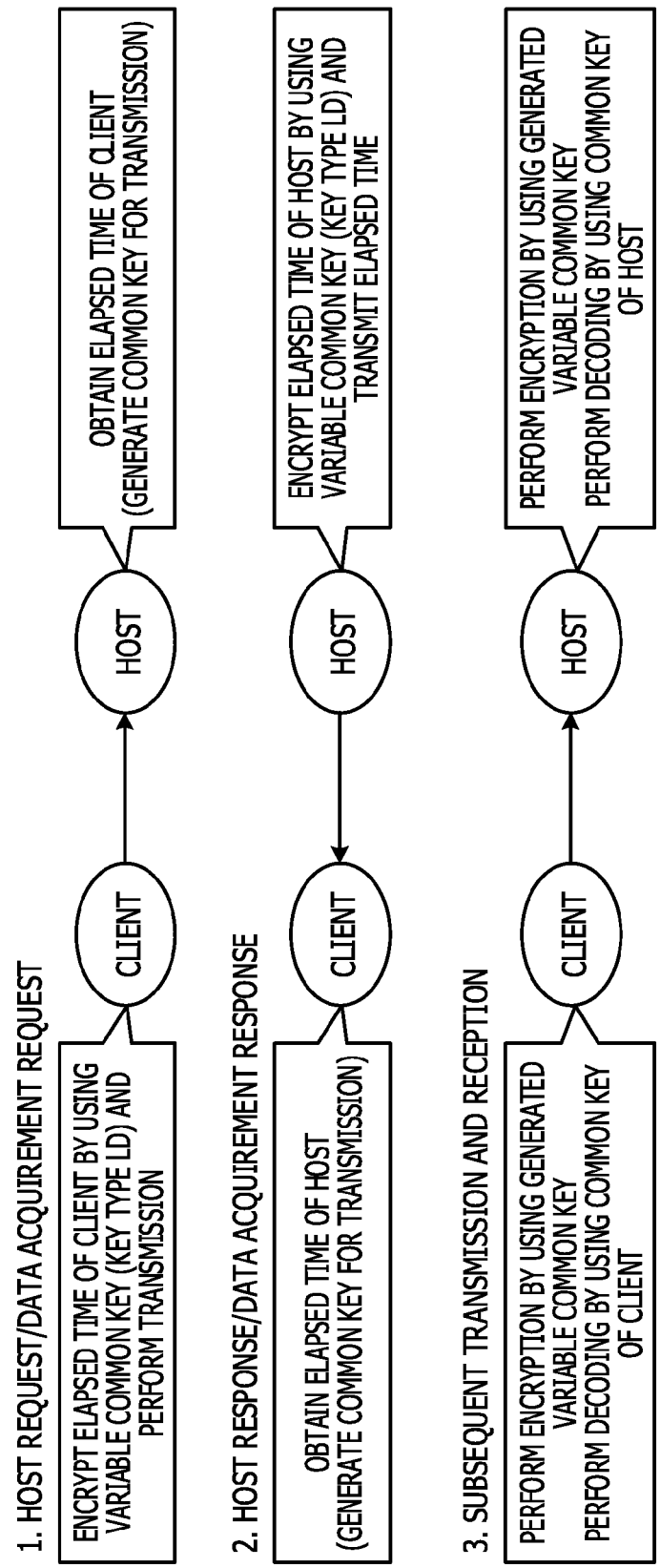
FIG. 17 is a diagram describing an example of encryption and decoding in a first application example.

Next, with reference to FIG. 17, a first application example will be described. It is assumed that a client node (client in FIG. 17) and a host node (host in FIG. 17) which are depicted as an example in FIG. 17 have the configuration of the node apparatus 1. The first application example is also called a client mode and depicts a mode of communication performed between the client node and the host node.

The client node is normally in a sleep state. Thus, the client node does not perform communication with an adjacent node apparatus. Therefore, the client node in the sleep state does not perform communication with the host node.

After changing from the sleep state to a start-up state (WakeUp state), the client node receives the HELLO frame from an adjacent node apparatus 1. Since the HELLO frame contains the elapsed time of the host node, the client node stores the elapsed time of the host node contained in the first received HELLO frame in the link table 8.

As depicted in "1. Host request/data acquirement request" of FIG. 17, the key generating section 24 of the client node generates the variable common key whose key type is LD by using the elapsed time of the host node. The client node adds the elapsed time of the client node to a portion to be encrypted, the portion of a data frame to be transmitted. As an example, the payload of the data frame may contain the elapsed time of the client node.

The encrypting section 25 of the client node encrypts a portion of the data frame containing the payload. Therefore, the elapsed time of the client node is also encrypted by the variable common key. The frame transmitting section 6 of the client node transmits the encrypted data frame to the host node.

The host node measures the elapsed time after the transmission of the HELLO frame to the client node by the timer 10. The key generating section 24 of the host node generates the variable common key by using the elapsed time. The decoding section 27 of the host node decodes the frame transmitted by the client node. This makes it possible for the host node to recognize the elapsed time of the client node.

Next, as depicted in "2. Host response/data acquirement response" of FIG. 17, the host node generates the variable common key whose key type is LD. The host node adds the elapsed time of the host node to a portion to be encrypted, the portion of a data frame to be transmitted. As an example, the payload of the data frame may contain the elapsed time of the host node.

The encrypting section 25 of the host node encrypts a portion of the data frame containing the payload. Therefore, the elapsed time of the host node is also encrypted by the variable common key. The frame transmitting section 6 of the host node transmits the encrypted data frame to the client node.

The client node measures the elapsed time after the transmission of the data frame to the host node by the timer 10. The key generating section 24 of the client node generates the variable common key by using the elapsed time. The decoding section 27 of the client node decodes the frame transmitted by the host node. This makes it possible for the client node to recognize the elapsed time of the host node.

In the subsequent communication between the client node and the host node, as depicted in "3. Subsequent transmission and reception" of FIG. 17, when the data frame is transmitted, encryption is performed by using the variable common key generated by using the elapsed time obtained from the node apparatus 1 at the other end. At this time, the elapsed time of the node apparatus 1 is added to a portion of the data frame, the portion to be encrypted. This makes it possible for the client node and the host node to perform encryption by using the elapsed time of the node apparatus 1 at the other end.

When the client node and the host node perform decoding, the client node and the host node each generate the variable common key by using the elapsed time of the node apparatus 1 thereof. Then, the client node and the host node each decode the received data frame by using the generated variable common key.

Therefore, the client node and the host node transmit the data frame containing the encrypted elapsed time thereof, which makes it possible for the client node and the host node to generate the variable common key using the elapsed time based on the data frame, not the HELLO frame.

In particular, in order to reduce electricity, when communication is not performed for a given length of time, the client node enters the sleep state. It is not possible for the client node in the sleep state to receive a HELLO frame. In such a case, by adding the elapsed time to the data frame, it is possible to communicate a data frame with a high degree of confidentiality. Moreover, it is possible to reduce electricity.

Second Application Example

Next, with reference to FIGS. 18 and 19, a second application example will be described. The second application example is an example which is called GD retrieval. The GD retrieval is used when the gateway apparatus (GW in FIGS. 18 and 19) transmits a frame to one particular node apparatus 1. The frame to be transmitted is also called unicast (UC) data.

If the address of a destination node apparatus 1 (hereinafter referred to as a particular node apparatus) to which a frame (UC data) is transmitted is not stored in the routing table of the gateway apparatus, the GD retrieval is performed.

When the GD retrieval is performed, the gateway apparatus inquires whether or not the routing table 9 of a node apparatus 1 adjacent thereto stores the address of the particular node apparatus. Then, if there is a node apparatus 1 that stores the address of the particular node apparatus in the routing table, the frame is transmitted via this node apparatus 1. This node apparatus 1 is assumed to be a response node.

By using FIGS. 18 and 19, the GD retrieval will be described. The GD retrieval includes a GD retrieval request and a GD retrieval response. The GD retrieval request inquires of the node apparatus 1 to which the gateway apparatus is adjacent whether or not the address of the particular node apparatus is stored.

As depicted in "1. GD retrieval request" of FIG. 18, when the GD retrieval request is performed, the gateway apparatus encrypts the GD retrieval request by using the fixed common key. The GD retrieval request may be encrypted by the variable common key.

The response node decodes the frame of the GD retrieval request. Since the frame of the GD retrieval request is encrypted by the fixed common key, the response node is capable of decoding the frame of the GD retrieval request.

Next, the GD retrieval response will be described. A-2 of FIG. 18 depicts the GD retrieval response when encryption is performed by using the fixed common key. In response to the GD retrieval request from the gateway apparatus, the response node makes a response to the effect that the response node stores the address of the particular node apparatus. The response node transmits, to the gateway apparatus, a frame containing this response (a GD channel is present) encrypted by the fixed common key.

By decoding the fixed common key, the gateway apparatus confirms the response node as a destination of the frame. That is, the gateway apparatus transmits the data frame to the particular node apparatus via the response node.

A-3 of FIG. 18 depicts an example of the subsequent transmission and reception. The data frame that is transmitted and received between the gateway apparatus and the response node has to have a high degree of confidentiality. Therefore, the data frame is encrypted by the variable common key.

If the elapsed time of the response node is not stored in the link table (LT in FIG. 18), the gateway apparatus is not capable of encrypting a frame by the variable common key whose key type is LD (which is sometimes written as an LD common key in FIG. 18 and subsequent drawings). Therefore, the gateway apparatus encrypts the frame by using the variable common key whose key type is LS.

The gateway apparatus transmits the encrypted data frame to the response node. The response node does not store the elapsed time of the gateway apparatus in the link table 8. Therefore, it is not possible to decode the data frame encrypted by the variable common key whose key type is LS.

On the other hand, if the elapsed time of the gateway apparatus is not stored in the link table 8, the response node encrypts the data frame by using the variable common key whose key type is LS. The response node transmits the encrypted data frame to the gateway apparatus.

If the elapsed time of the response node is not stored in the link table, the gateway apparatus is not capable of decoding the data frame encrypted by the variable common key whose key type is LS. Therefore, in the case of A-2 and A-3 of FIG. 18, it is not possible to perform transmission and reception of the data frame between the gateway apparatus and the response node.

Next, the GD retrieval response performed when encryption is performed by using the variable common key whose key type is LD will be described. As depicted in B-2 of FIG. 18, if the elapsed time of the gateway apparatus is stored in the link table 8, the response node generates the variable common key by using the stored elapsed time. Then, the response node encrypts the frame by using the variable common key and transmits the encrypted frame to the gateway apparatus.

Since the gateway apparatus has received the frame encrypted by the variable common key whose key type is LD (which is sometimes written as an LD common key in FIG. 18 and subsequent drawings), the gateway apparatus is capable of decoding the frame. As a result, it is confirmed that a destination of the frame is the response node.

B-3 of FIG. 18 depicts an example of subsequent transmission and reception. A case in which the gateway apparatus transmits a data frame to the response node will be described. If the elapsed time of the response node is not stored in the link table of the gateway apparatus, the gateway apparatus encrypts the data frame by using the variable common key whose key type is LS. Then, the gateway apparatus transmits the data frame to the response node.

The response node stores the elapsed time of the gateway apparatus in the link table 8. Thus, the response node is capable of generating the variable common key whose key type is LD. The response node decodes the received frame by using the variable common key whose key type is LD.

Next, a case in which the response node transmits a data frame to the gateway apparatus will be described. The response node stores the elapsed time of the gateway apparatus in the link table 8. Thus, the response node encrypts the data frame by using the variable common key whose key type is LD.

Since the response node has received the variable common key whose key type is LD, the response node generates the variable common key by using the elapsed time of the response node. Then, the response node decodes the data frame by using the variable common key of the response node. Therefore, it is possible to perform transmission and reception of the data frame between the gateway apparatus and the response node with a high degree of confidentiality.

Next, the GD retrieval response which is performed when encryption is performed by using the variable common key whose key type is LS will be described. As depicted in C-2 of FIG. 19, if the elapsed time of the gateway apparatus is not stored in the link table 8, the response node generates the variable common key by using the elapsed time of the response node. Then, the response node encrypts the data frame by using the variable common key whose key type is LS and transmits the encrypted frame to the gateway apparatus.

If the elapsed time of the response node is stored in the link table, the gateway apparatus generates the variable common key whose key type is LD by using this elapsed time. The gateway apparatus decodes the received frame by using the generated variable common key. As a result, it is confirmed that the gateway apparatus transmits the data frame to the response node.

Figure 19:
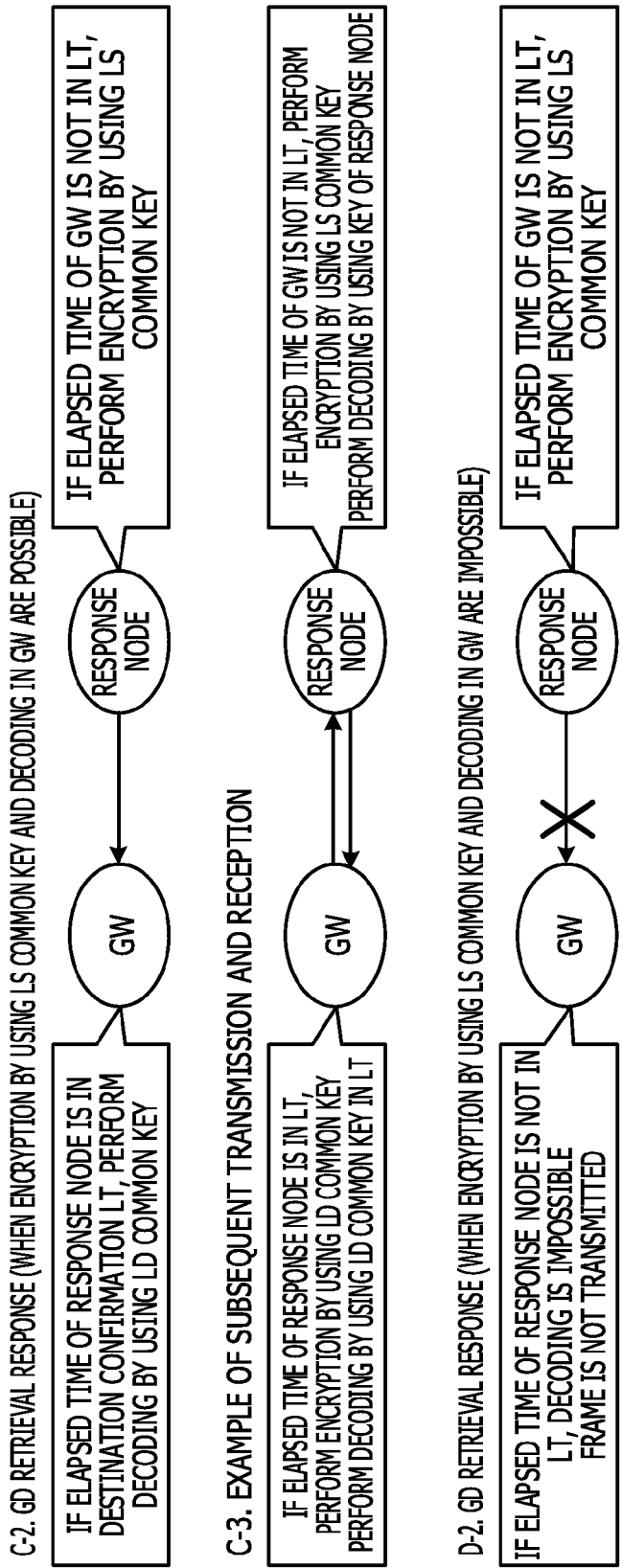
FIG. 19 is a diagram (II) describing an example of encryption and decoding in the second application example.

C-3 of FIG. 19 depicts an example of subsequent transmission and reception. Since the elapsed time of the response node is stored in the link table, the gateway apparatus generates the variable common key whose key type is LD by using this elapsed time. The gateway apparatus encrypts the data frame by using the generated variable common key and transmits the data frame to the response node.

Since the response node has received the data frame encrypted by the variable common key whose key type is LD, the response node decodes the received data frame by using the variable common key generated by using the elapsed time of the response node.

A case in which the response node transmits a data frame to the gateway apparatus will be described. The response node does not store the elapsed time of the gateway apparatus in the link table 8. Therefore, the response node encrypts the data frame by using the variable common key using the elapsed time of the response node. Then, the response node transmits the encrypted data frame to the gateway apparatus.

The gateway apparatus stores the elapsed time of the response node in the link table. Therefore, the response node generates the variable common key whose key type is LD by using the elapsed time in the link table. Then, the gateway apparatus decodes the frame by using the generated variable common key. Therefore, it is possible to perform transmission and reception of the data frame between the gateway apparatus and the response node with a high degree of confidentiality.

D-2 of FIG. 19 depicts an example of the GD retrieval response which is performed when encryption is performed by using the variable common key whose key type is LS and the gateway apparatus is not capable of performing decoding. If the elapsed time of the gateway apparatus is not stored in the link table 8, the response node generates the variable common key whose key type is LS by using the elapsed time of the response node. Then, the response node encrypts a frame of the retrieval response by using the generated variable common key and transmits the frame of the retrieval response to the gateway apparatus.

If the elapsed time of the response node is not stored in the link table, the gateway apparatus is not capable of decoding the received frame. In this case, the gateway apparatus does not store the elapsed time of the response node and the response node does not store the elapsed time of the gateway apparatus.

Therefore, even when the information on the particular node apparatus is stored in the routing table of the response node, in the case of D-2 of FIG. 19, the gateway apparatus does not transmit the data frame to the response node. That is, the response node in D-2 of FIG. 19 is not selected as a destination of the data frame. In this case, another response node is retrieved, and the gateway apparatus transmits the frame to the response node via the other response node.

Third Application Example

Figure 20:
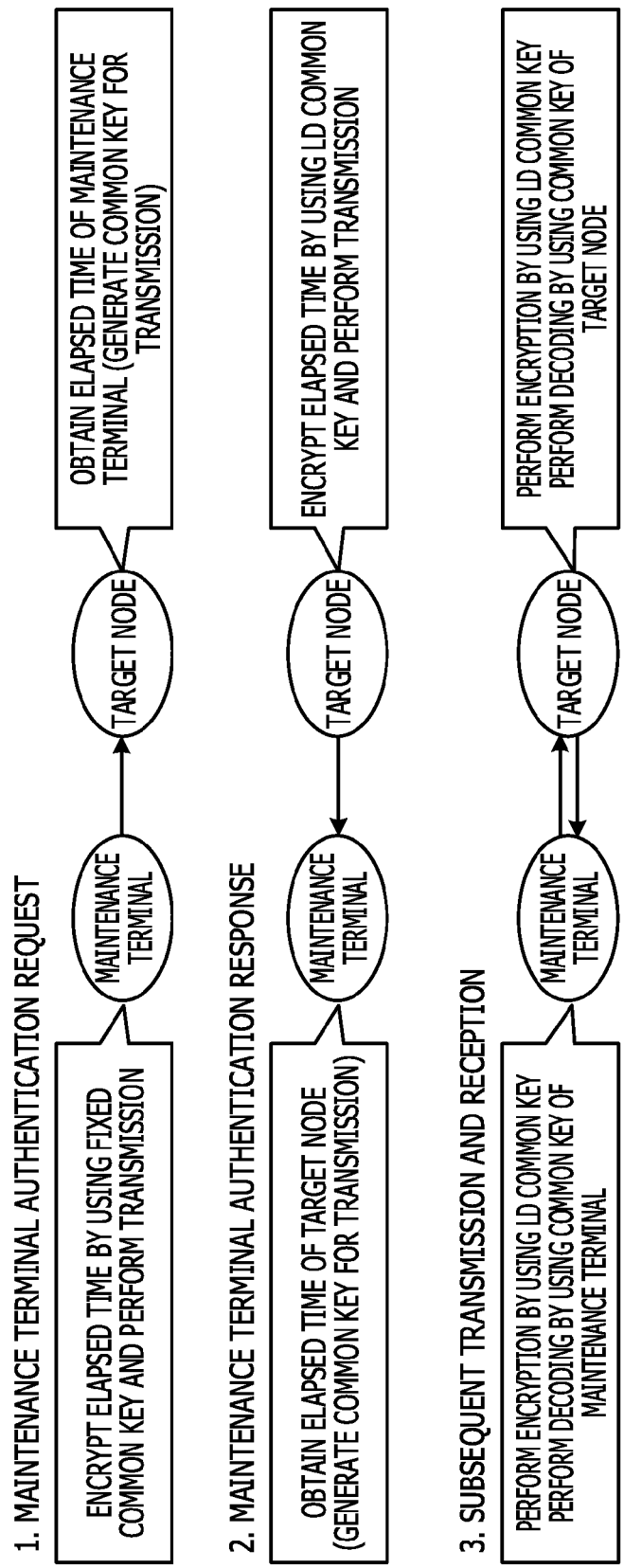
FIG. 20 is a diagram describing an example of encryption and decoding in a third application example.

Next, with reference to FIG. 20, an example in which the maintenance terminal performs communication with a node apparatus will be described. The maintenance terminal is a terminal that is capable of operating an arbitrary node apparatus. Thus, if the maintenance terminal is subject to unauthorized attack, the whole network may be subject to the attack. Thus, the maintenance terminal does not transmit a data frame by using the fixed common key.

An example in which a data frame is transmitted and received between the maintenance terminal and a node apparatus 1 (hereinafter referred to as a target node) will be described. As depicted in "1. Maintenance terminal authentication request" of FIG. 20, the maintenance terminal encrypts a frame containing the elapsed time of the maintenance terminal by using the fixed common key and transmits the encrypted frame to the target node.

The target node decodes the frame encrypted by the fixed common key and obtains the elapsed time of the maintenance terminal. As depicted in "2. Maintenance terminal authentication response" of FIG. 20, the target node encrypts the elapsed time of the target node by using the variable common key whose key type is LD and transmits the encrypted frame to the maintenance terminal.

Since the maintenance terminal has received the frame encrypted by the variable common key whose key type is LD, the maintenance terminal is capable of decoding the received frame. This makes it possible for the maintenance terminal to obtain the elapsed time of the target node.

As depicted in "3. Subsequent transmission and reception" of FIG. 20, when the maintenance terminal and the target node perform transmission of a data frame, the maintenance terminal and the target node encrypt a data frame by using the variable common key whose key type is LD.

When the maintenance terminal and the target node perform reception of a data frame, the maintenance terminal and the target node generate the variable common key by using the elapsed time thereof and decode the received data frame by using the generated variable common key. Therefore, it is possible to perform transmission and reception of the data frame between the maintenance terminal and the target node with a high degree of confidentiality.

<Example of the Hardware Configuration of the Node Apparatus>

Figure 21:
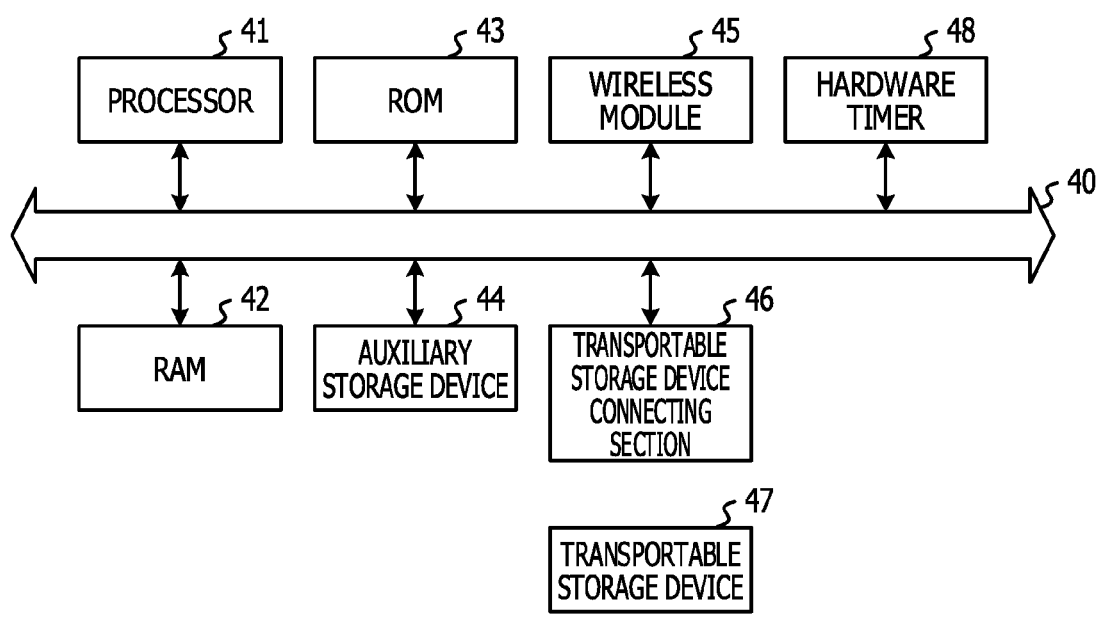
FIG. 21 is a diagram depicting an example of the hardware configuration of the node apparatus.

Next, an example of the hardware configuration of the node apparatus 1 will be described. As depicted in FIG. 21, the node apparatus 1 includes a processor 41, random-access memory (RAM) 32, read-only memory (ROM) 33, an auxiliary storage device 44, a wireless module 45, a transportable storage device connecting section 46, and a hardware timer 48 which are connected to a bus 40.

The processor 41 is an arbitrary processing circuit such as a central processing unit (CPU). The processor 41 executes a program expanded in the RAM 42. The ROM 43 is a nonvolatile storage device that stores a program that is expanded in the RAM 42. The program that is expanded in the RAM 42 may be stored also in the auxiliary storage device 44. As an example of the storage device, flash memory, a hard disk drive, and so forth may be used.

The wireless module 45 is a communication interface that has the function of making the node apparatus 1 perform wireless communication with another communication apparatus. Communication between a node apparatus and another node apparatus and communication between the node apparatus and the gateway apparatus are performed via the wireless module 45.

The transportable storage device connecting section 46 is provided in such a way as to be connectable to the transportable storage device 47. As the transportable storage device 47, a transportable memory and optical disks (for example, a compact disk (CD), a digital video disk (DVD), and so forth) may be used. The hardware timer 48 counts the time.

The RAM 42, the ROM 43, and the auxiliary storage device 44 are examples of computer-readable tangible storage media. These tangible storage media are not temporary media such as signal carrier waves.

As an example, the frame receiving section 2 and the frame transmitting section 6 may be implemented by the wireless module 45. The frame received information analyzing section 3, the control section 4, and the frame transmitted information generating section 5 may be implemented by the processor 41. The fixed common key storing section 21 may be implemented by the ROM 43. The link table 8 and the routing table 9 may be implemented by the auxiliary storage device 44. The timer 10 may be implemented by the hardware timer 48.

<Example of the Hardware Configuration of the Gateway Apparatus>

Figure 22:
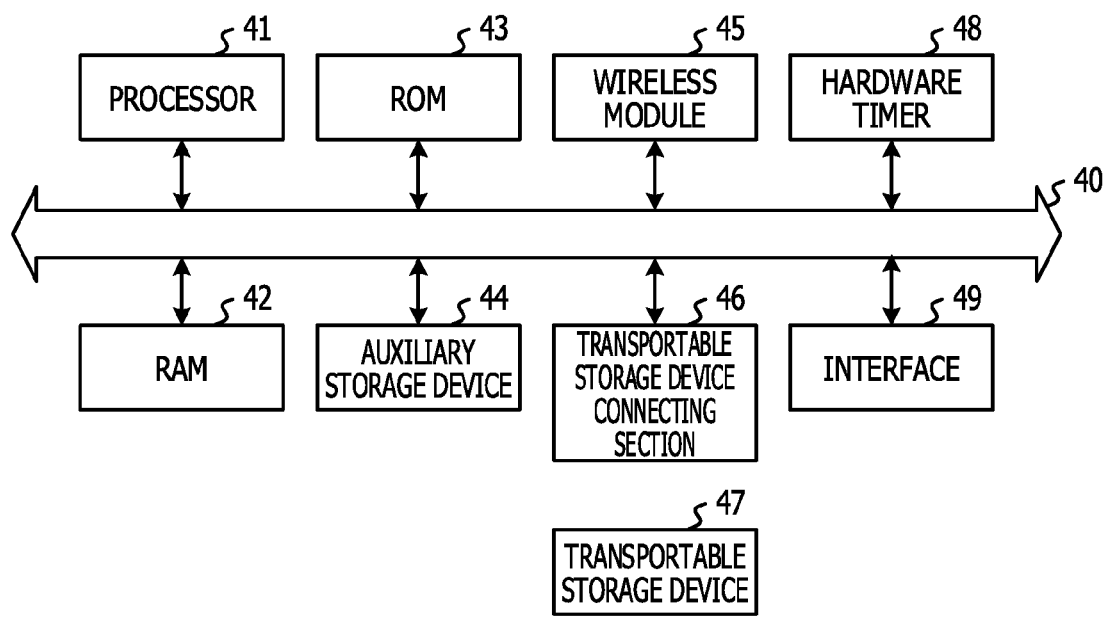
FIG. 22 is a diagram depicting an example of the hardware configuration of a gateway apparatus.

FIG. 22 depicts an example of the hardware configuration of the gateway apparatus. The gateway apparatus is a kind of node apparatus, and the gateway apparatus and the node apparatus have almost the same hardware configuration. The gateway apparatus further has an interface 49 in the hardware configuration of the node apparatus depicted in FIG. 21. The interface 49 may be used when the gateway apparatus performs communication with the network server.

While the disclosed embodiment and the advantages thereof have been described in detail, a person skilled in the art is allowed to make various changes, additions, and omissions without departing from the scope of the embodiment clearly described in the claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An apparatus comprising:
a memory; and a processor coupled to the memory and configured to:
receive a certain frame from another apparatus, the certain frame including a first amount of time that has elapsed since a start-up time of the another apparatus,
determine a first total amount of time by adding the first amount of time that has elapsed since the start-up time of the another apparatus and a second amount of time that has elapsed between reception of the certain frame and transmission of a first data frame to the another apparatus,
when a second data frame transmitted from the another apparatus is received,
determine a second total amount of time by adding the first amount of time that has elapsed since the start-up time of the another apparatus and a third amount of time that has elapsed since the certain frame was received,
generate a first common key using the first total amount of time,
encrypt the first data frame using the first common key, and
transmit the encrypted first data frame to the another apparatus, and
generate a second common key using the second total amount of time and decrypt the second data frame received from the another apparatus using the second common key.

2. The apparatus according to claim 1, wherein the processor is configured to normalize at least any one of the first total amount of time and the second total amount of time at intervals of a predetermine amount of time.

3. The apparatus according to claim 1, wherein the first total amount of time is encrypted, and the encrypted first total amount of time is added to the first data frame.

4. The apparatus according to claim 1, wherein the another apparatus is a maintenance terminal that generates another common key whose key value varies based on the second total amount of time and encrypts a data frame to be transmitted to the apparatus by the another common key.

5. The apparatus according to claim 1, wherein
the certain frame is a first HELLO frame received from the another apparatus after a state is changed from a sleep state to a start-up state.

6. The apparatus according to claim 1, wherein the processor is configured to notify the another apparatus of the second total amount of time.

7. The apparatus according to claim 1, wherein the processor is configured to approve the second data frame when an identification number corresponding to a normalized time contained in the second data frame is within a range corresponding to a time obtained by normalizing the second total amount of time and not to approve the second data frame when the identification number is not within the range.

8. The apparatus according to claim 1, wherein the another apparatus is configured to decrypt the first data frame using a common key whose key value varies based on the first total amount of time when receiving the first data frame encrypted by the first common key.

9. A method comprising:
receiving, by a first apparatus, a certain frame from a second apparatus, the certain frame including a first amount of time that has elapsed since a start-up time of the second apparatus,
determining a first total amount of time by adding the first amount of time that has elapsed since the start-up time of the second apparatus and a second amount of time that has elapsed between reception of the certain frame and transmission of a first data frame from the first apparatus to the second apparatus,
when a second data frame transmitted from the second apparatus is received by the first apparatus,
determining a second total amount of time by adding the first amount of time that has elapsed since the start-up time of the second apparatus and a third amount of time that has elapsed since the certain frame was received, generating a first common key using the first total amount of time, encrypting the first data frame using the first common key, and transmitting the encrypted first data frame to the second apparatus, and generating a second common key using the second total amount of time and decrypting the second data frame received from the second apparatus using the second common key.

10. A non-transitory computer-readable medium including a program which, when executed by a computer, causes the computer to:

upon reception by a first apparatus of a certain frame transmitted from a second apparatus, the certain frame including a first amount of time that has elapsed since a start-up time of the second apparatus, determine a first total amount of time by adding the first amount of time that has elapsed since the start-up time of the second apparatus, and a second amount of time that has elapsed between reception of the certain frame and transmission of a first data frame from the first apparatus to the second apparatus, when a second data frame transmitted from the second apparatus is received by the first apparatus, determine a second total amount of time by adding the first amount of time that has elapsed since the start-up time of the second apparatus and a third amount of time that has elapsed since the certain frame was received, generate a first common key using the first total amount of time, encrypt the first data frame using the first common key, and transmit the encrypted first data frame to the second apparatus, and generate a second common key using the second total amount of time and decrypting the second data frame received from the second apparatus using the second common key.

11. The apparatus according to claim 1, wherein the certain frame is a HELLO frame.

12. The method according to claim 9, wherein the certain frame is a HELLO frame.

13. The non-transitory computer-readable medium according to claim 10, wherein the certain frame is a HELLO frame.

* * * * *